US012217752B2

(12) United States Patent
Kane

(10) Patent No.: US 12,217,752 B2
(45) Date of Patent: Feb. 4, 2025

(54) SYSTEM METHOD AND APPARATUS FOR COMBINING WORDS AND BEHAVIORS

(71) Applicant: VERINT AMERICAS INC., Alparetta, GA (US)

(72) Inventor: John Kane, Glen of the Downs (IE)

(73) Assignee: VERINT AMERICAS INC., Alpharetta, GA (US)

( * ) Notice: Subject to any disclaimer, the term of this patent is extended or adjusted under 35 U.S.C. 154(b) by 174 days.

(21) Appl. No.: 17/749,677

(22) Filed: May 20, 2022

(65) Prior Publication Data

US 2022/0375468 A1 Nov. 24, 2022

Related U.S. Application Data

(60) Provisional application No. 63/191,372, filed on May 21, 2021.

(51) Int. Cl.
| | |
|---|---|
| *G06F 40/30* | (2020.01) |
| *G06F 40/279* | (2020.01) |
| *G10L 15/18* | (2013.01) |
| *G10L 15/22* | (2006.01) |
| *G10L 15/30* | (2013.01) |
| *G10L 25/63* | (2013.01) |
| *H04M 3/51* | (2006.01) |

(52) U.S. Cl.
CPC ............ *G10L 15/22* (2013.01); *G06F 40/279* (2020.01); *G10L 15/18* (2013.01); *G10L 15/30* (2013.01); *G10L 25/63* (2013.01); *G10L 2015/225* (2013.01); *H04M 3/5183* (2013.01)

(58) Field of Classification Search
None
See application file for complete search history.

(56) References Cited

U.S. PATENT DOCUMENTS

| 11,250,876 | B1 * | 2/2022 | McCloskey | G06N 20/10 |
| 2020/0195779 | A1 | 6/2020 | Weisman et al. | |
| 2021/0029248 | A1 | 1/2021 | Scodary et al. | |
| 2021/0056600 | A1 * | 2/2021 | Stretch | G06Q 30/01 |
| 2021/0201934 | A1 * | 7/2021 | Lyu | G06Q 10/06315 |
| 2021/0392230 | A1 * | 12/2021 | Shah | H04M 3/5175 |

FOREIGN PATENT DOCUMENTS

| CN | 110751943 | A | * | 2/2020 | ........... G06F 16/685 |
| CN | 112527994 | A | * | 3/2021 | |
| KR | 20220063817 | A | * | 5/2022 | |
| KR | 102429365 | B1 | * | 8/2022 | |

OTHER PUBLICATIONS

Extended European Search Report issued in counterpart European Patent Application No. 22174512.8, mailed Oct. 13, 2022.

* cited by examiner

*Primary Examiner* — Shreyans A Patel
(74) *Attorney, Agent, or Firm* — Meunier Carlin & Curfman LLC

(57) ABSTRACT

A system and method for integrating audio data collected, such as audio data and analytical data, to perform behavioral analysis on the audio data, using an application of acoustic signal processing and machine learning algorithms, by converting the audio data to text data and performing behavioral analysis on the text data. The behavioral analysis data from the audio application of acoustic signal processing is combined with machine learning algorithms and speech to text data to provide a call agent with feedback to assist in the next best action or insight into customer behaviors.

20 Claims, 21 Drawing Sheets

300

| User ID | Company | Audio File |
|---|---|---|
| TS789654 | Comcast | TS789654.7.20.2020.1.30.mp3 |
| TS789655 | Comcast | TS789654.7.20.2020.1.45.mp3 |
| TS789656 | Comcast | TS789654.7.20.2020.2.30.mp3 |
| TS789657 | Comcast | TS789654.7.20.2020.3.00.mp3 |
| TS789658 | Comcast | TS789654.7.20.2020.3.15.mp3 |
| - | - | - |
| - | - | - |
| - | - | - |
| SH123456 | Comcast | SH123456.7.20.2020.12.00.mp3 |
| SH123457 | Comcast | SH123456.7.20.2020.12.15.mp3 |
| SH123458 | Comcast | SH123456.7.20.2020.12.35.mp3 |
| - | - | - |
| - | - | - |
| - | - | - |

FIG. 6

| | General | | | Behavioral Parameters | | | | | |
|---|---|---|---|---|---|---|---|---|---|
| User ID | Company | Audio File | Event Time | Agent Pace | Client Pace | Agent Waveform Frequency | Client Waveform Frequency | Agent Avg. Decibel | Client Avg. Decibel |
| TS789654 | Comcast | TS789654.7.20.2020.1.30.mp3 | 15 minutes | 160/wpm | 150/wpm | 255Hz | 220Hz | 50db | 55db |
| TS789655 | Comcast | TS789654.7.20.2020.1.45.mp3 | 45 minutes | 175/wpm | 170/wpm | 250Hz | 350Hz | 55db | 70db |
| TS789656 | Comcast | TS789654.7.20.2020.2.30.mp3 | 30 minutes | 180/wpm | 190/wpm | 260Hz | 225Hz | 60db | 62db |
| TS789657 | Comcast | TS789654.7.20.2020.3.00.mp3 | 15 minutes | 165/wpm | 155/wpm | 258Hz | 245Hz | 58db | 65db |
| TS789658 | Comcast | TS789654.7.20.2020.3.15.mp3 | 15 minutes | 170/wpm | 185/wpm | 255Hz | 230Hz | 56db | 63db |
| . | . | . | . | . | . | . | . | . | . |
| . | . | . | . | . | . | . | . | . | . |
| . | . | . | . | . | . | . | . | . | . |
| SH123456 | Comcast | SH123456.7.20.2020.12.00.mp3 | 15 minutes | 180/wpm | 160/wpm | 225Hz | 250Hz | 54db | 60db |
| SH123457 | Comcast | SH123456.7.20.2020.12.15.mp3 | 20 minutes | 185/wpm | 169/wpm | 230Hz | 290Hz | 50db | 75db |
| SH123458 | Comcast | SH123456.7.20.2020.12.35.mp3 | 10 minutes | 182/wpm | 163/wpm | 227Hz | 265Hz | 53db | 64db |
| . | . | . | . | . | . | . | . | . | . |
| . | . | . | . | . | . | . | . | . | . |
| . | . | . | . | . | . | . | . | . | . |

FIG. 8

| | General | | | | | Text Parameters | | |
|---|---|---|---|---|---|---|---|---|
| User ID | Company | Audio File | Text File | Event Time | Number of Questions | Number of anger words | Number of Polite words | Number of Curse words |
| TS789654 | Comcast | TS789654.7.20.2020.1.30.mp3 | TS789654.7.20.2020.1.30.Text | 15 minutes | 4 | 1 | 3 | 0 |
| TS789655 | Comcast | TS789654.7.20.2020.1.45.mp3 | TS789654.7.20.2020.1.45.Text | 45 minutes | 12 | 6 | 2 | 3 |
| TS789656 | Comcast | TS789654.7.20.2020.2.30.mp3 | TS789654.7.20.2020.2.30.Text | 30 minutes | 5 | 2 | 1 | 0 |
| TS789657 | Comcast | TS789654.7.20.2020.3.00.mp3 | TS789654.7.20.2020.3.00.Text | 15 minutes | 3 | 0 | 4 | 0 |
| TS789658 | Comcast | TS789654.7.20.2020.3.15.mp3 | TS789654.7.20.2020.3.15.Text | 15 minutes | 5 | 1 | 3 | - |
| . | . | . | . | . | . | . | . | . |
| . | . | . | . | . | . | . | . | . |
| SH123456 | Comcast | SH123456.7.20.2020.12.00.mp3 | SH123456.7.20.2020.12.00.Text | 15 minutes | 2 | 0 | 3 | 0 |
| SH123457 | Comcast | SH123456.7.20.2020.12.15.mp3 | SH123456.7.20.2020.12.15.Text | 20 minutes | 5 | 2 | 1 | 1 |
| SH123458 | Comcast | SH123456.7.20.2020.12.35.mp3 | SH123456.7.20.2020.12.35.Text | 10 minutes | 3 | 1 | 2 | 0 |
| . | . | . | . | . | . | . | . | . |
| . | . | . | . | . | . | . | . | . |
| . | . | . | . | . | . | . | . | . |

| Behavior Parameter | Text Parameter | NLP Parameters | Feedback |
|---|---|---|---|
| >195 Agent Words per minute | - | - | Speak Slower |
| Agent Average Decibel level <40db | - | - | Speak Louder |
| - | >3 questions per minute | - | Customer is confused, provide more details |
| - | >3 Polite Words per minute | - | Agent Currently Satisfying Customer |
| - | - | - | |
| <125 Agent Words per minute | >2 Anger Words per minute | - | Speak Faster |
| Agent Decibel level <85db | 1 Curse Word per minute | - | Speak Softer |
| >165 Client Words per minute | >4 Question per minute | Positive Interaction | Provide Customer Details of other services |
| Client Frequency Waveform >350Hz | >2 Curse Words | Negative Interaction | Transfer call to supervisor |
| - | - | - | |
| - | - | - | |

FIG. 10

| General | | | | | Behavioral Parameters | | | | | Text Parameters | | | |
|---|---|---|---|---|---|---|---|---|---|---|---|---|---|
| User ID | Company | Audio File | Event Time | Agent Pace | Client Pace | Agent Waveform Frequency | Client Waveform Frequency | Agent Avg. Decibel | Client Avg. Decibel | Number of Questions | Number of Anger words | Number of Polite words | Number of Curse words | Feedback Results |
| TS789654 | Comcast | TS789654.7.20.2020.1.30.mp3 | 15 minutes | 160/wpm | 150/wpm | 255Hz | 220Hz | 50db | 55db | 4 | 1 | 3 | 0 | Customer is Satisfied |
| TS789655 | Comcast | TS789654.7.20.2020.1.45.mp3 | 45 minutes | 175/wpm | 170/wpm | 250Hz | 350Hz | 55db | 70db | 12 | 6 | 2 | 3 | Customer is Angry |
| TS789656 | Comcast | TS789654.7.20.2020.2.30.mp3 | 30 minutes | 180/wpm | 190/wpm | 260Hz | 225Hz | 60db | 62db | 5 | 2 | 1 | 0 | Customer is Confused |
| TS789657 | Comcast | TS789654.7.20.2020.3.00.mp3 | 15 minutes | 165/wpm | 155/wpm | 258Hz | 245Hz | 58db | 65db | 3 | 0 | 4 | 0 | Customer is Satisfied |
| TS789658 | Comcast | TS789654.7.20.2020.3.15.mp3 | 15 minutes | 170/wpm | 185/wpm | 255Hz | 230Hz | 56db | 63db | 5 | 1 | 3 | 0 | Customer is Confused |
| . | . | . | . | . | . | . | . | . | . | . | . | . | . | . |
| . | . | . | . | . | . | . | . | . | . | . | . | . | . | . |
| SH123456 | Comcast | SH123456.7.20.2020.12.00.mp3 | 15 minutes | 180/wpm | 160/wpm | 225Hz | 250Hz | 54db | 60db | 2 | 0 | 3 | 0 | Customer is Satisfied |
| SH123457 | Comcast | SH123456.7.20.2020.12.15.mp3 | 20 minutes | 185/wpm | 169/wpm | 230Hz | 290Hz | 50db | 75db | 5 | 2 | 1 | 1 | Customer is Angry |
| SH123458 | Comcast | SH123456.7.20.2020.12.35.mp3 | 10 minutes | 182/wpm | 163/wpm | 227Hz | 265Hz | 53db | 64db | 3 | 1 | 2 | 0 | Customer is Confused |
| . | . | . | . | . | . | . | . | . | . | . | . | . | . | . |
| . | . | . | . | . | . | . | . | . | . | . | . | . | . | . |

FIG. 13

| Feedback Result 1452 | Behavior Parameter 1450 | Text Parameter 1454 |
|---|---|---|
| Customer is Angry | Customer Average Decibel Level <65 db during 15 minute event | - |
| Customer is Angry | - | Customer Says >2 Curse Words during 15 minutes event |
| Customer is Angry | Customer Average waveform frequency >350Hz during 15 minute event | Customer Says >5 Anger Words during 15 minutes event |
| - | - | - |
| - | - | - |
| Customer is Confused | Customer uses >170 words per minute during 15 minutes event | Customer Says >3 questions during 15 minutes event |
| Customer is Confused | Customer Average Waveform Frequency <250Hz during 15 minutes event | Customer Says >5 questions during 15 minutes event |
| - | - | - |
| - | - | - |
| Customer is Satisfied | Customer Average Decibel Level >55db during 15 minutes event | Customer Says >6 Polite words during 15 minutes event |
| Customer is Satisfied | Customer Average Waveform Frequency >230Hz during 15 minutes event | Customer Says <2 questions during 15 minutes event |
| - | - | - |
| - | - | - |
| - | - | - |

FIG. 14

SYSTEM METHOD AND APPARATUS FOR COMBINING WORDS AND BEHAVIORS

CROSS REFERENCE TO RELATED APPLICATIONS

The present application claims the benefit of U.S. Provisional Patent Application No. 63/191,372 filed May 21, 2021, entitled "Combining Words and Behaviors for Real-Time Conversational Guidance Using Audio Signal Processing and Natural Language Processing," the entire disclosure of which is hereby incorporated herein by reference.

FIELD OF THE DISCLOSURE

The present disclosure is generally related to integrating behavioral analysis of acoustic signal processing, machine learning algorithms, audio data, and speech-to-text data to provide real-time feedback to call agents.

BACKGROUND

Typically, annotating long conversations to indicate where in the conversation guidance may be needed is challenging. People's speaking and interaction patterns are heterogeneous and dealing with background noise can make this task difficult.

There are challenges in exploiting the complementary value in both "word" and "behavior" channels, which are used separately to analyze, score, and guide contact center call agents. Thus, it would be an advancement in the art to combine the audio and text analysis of an interaction between a call agent and a customer to provide more detailed, refined contextually-aware feedback that could overcome these challenges.

BRIEF SUMMARY OF THE DISCLOSURE

One embodiment is directed to a computer-implemented method ("the Method") for outputting feedback to a selected device, the method comprising: using at least one hardware processor for extracting code for: accessing audio data; generating behavioral data by performing behavioral analysis of at least a portion of the audio data, the behavioral analysis including acoustic signal processing of the portion of audio data and applying one or more machine learning algorithms to the portion of the audio data; generating text data by converting at least a portion of the audio data to text data; analyzing the text data using natural language processing; generating integrated data by combining the behavioral data with the analyzed text data; accessing rules of a set of rules; comparing the integrated data to the rules; generating feedback data based on the comparison; and outputting the feedback data to a selected device.

Another embodiment is directed to the Method described above, further comprising outputting the feedback data to the selected device during a communication session.

Another embodiment is directed to the Method described above further comprising identifying one or more parameters of the audio data; and utilizing one or more of the parameters during the generation of the behavioral data and the generation of the text data.

Another embodiment is directed to the Method described above, wherein the parameters include indicators of an emotional state of a caller.

Another embodiment is directed to the Method described above, wherein the selected device is a supervisory device.

Another embodiment is directed to the Method described above, wherein the audio data is obtained from a communication session between a caller and an agent.

Another embodiment is directed to the Method described above, where the selected device is an agent device.

Another embodiment is directed to the Method described above, where the selected device is located at a remote location.

Another embodiment is directed to the Method described above, further comprising utilizing the feedback data to affect a subsequent communication session.

Another embodiment is directed to a system for outputting feedback data to a selected device, comprising: one or more memories configured to store representations of data in an electronic form; and one or more processors, operatively coupled to one or more of the memories, the processors configured to access the data and process the data to: access audio data; generate behavioral data by performing behavioral analysis of at least a portion of the audio data, the behavioral analysis including acoustic signal processing of the portion of audio data and applying one or more machine learning algorithms to the portion of the audio data; store the behavioral data; generate text data by converting at least a portion of the audio data to text data; analyze the text data by applying natural language processing to the text data; store the text data; combine the stored behavioral data with the stored text data; compare the combined behavioral data and the text data to one or more rules; generate feedback data based on the comparison; and output the feedback data to a selected device.

Another embodiment is directed to a method for outputting feedback to a selected device comprising: accessing audio data; generating first behavioral data by performing behavioral analysis of at least a portion of the audio data, the behavioral analysis including acoustic signal processing of the portion of audio data and applying one or more machine learning algorithms to the portion of the audio data; generating text data by converting at least a portion of the audio data to text data; generating second behavioral data by applying natural language processing to the text data; generating integrated data by combining the first behavioral data with the second behavioral data; comparing the integrated data to a set of one or more rules; generating feedback data based on the comparison; and outputting the feedback data to a selected device.

Another embodiment is directed to the method for outputting feedback to a selected device, further comprising outputting the feedback data to the selected device during a communication session.

Another embodiment is directed to the method for outputting feedback to a selected device, further comprising identifying one or more parameters of the audio data; and utilizing one or more of the parameters during the generation of the behavioral data and the generation of the text data.

Another embodiment is directed to the method for outputting feedback to a selected device, wherein the parameters include indicators of an emotional state of a caller.

Another embodiment is directed to the method for outputting feedback to a selected device, wherein the selected device is a supervisory device.

Another embodiment is directed to the method for outputting feedback to a selected device, wherein the audio data is obtained from a communication session between a caller and an agent.

Another embodiment is directed to the method for outputting feedback to a selected device, wherein the user device is an agent device.

Another embodiment is directed to the method for outputting feedback to a selected device, wherein the selected device is located at a remote location.

Another embodiment is directed to the method for outputting feedback to a selected device, further comprising utilizing the feedback data to affect a subsequent communication session.

Another embodiment is directed to the method for outputting feedback to a selected device, further comprising storing the feedback data in a database.

Another embodiment is directed to combining acoustic and text input data at an early stage using multimodal neural network model architectures. This embodiment includes using at least one hardware processor for extracting code for: accessing audio data; identifying one or more acoustic portions of the audio data; identifying one or more text portions of the acoustic data; accessing one or more models; combining the one or more acoustic portion of the audio data and the one or more text portions of the audio data using the one or mode models; generating feedback data based on the combining; and outputting the feedback to a selected device.

BRIEF DESCRIPTION OF THE SEVERAL VIEWS OF THE DRAWINGS

The foregoing summary, as well as the following detailed description of the exemplary embodiments of the invention will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

In the drawings:

FIG. 6: illustrates an example of a platform acoustic database.

FIG. 8: illustrates an example of a platform speech database.

FIG. 10: illustrates an example of a platform rules database.

FIG. 13: illustrates an example of a platform historical database.

FIG. 14: illustrates an example of a platform ML (machine learning) model database.

DETAILED DESCRIPTION

Figure 1:
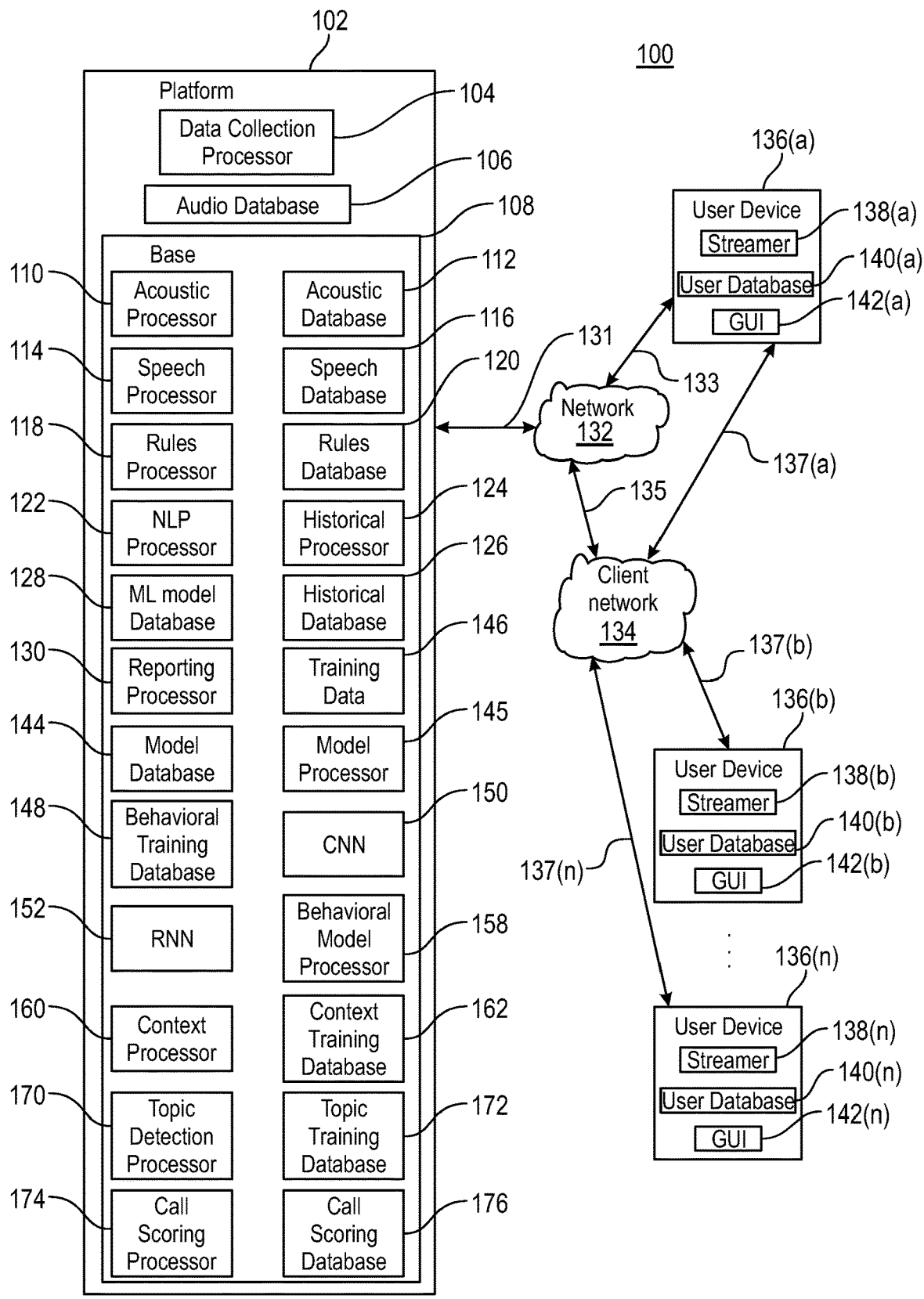
FIG. 1: illustrates an example of a real-time words system.

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not necessarily drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the subject disclosure.

Embodiments of the present disclosure will be described more thoroughly from now on regarding the accompanying drawings. Like numerals represent like elements throughout the several figures, and in which example embodiments are shown. However, embodiments of the claims may be embodied in many different forms and should not be construed as limited to the images set forth herein. The examples set forth herein are non-limiting examples and are merely examples, among other possible examples.

As stated above, there are challenges in exploiting the complementary value in both "word" and "behavior" channels, which are used separately to analyze, score, and guide contact center call agents.

If combined synergistically, these channels: word and behavior, would provide a much higher level of functionality and accuracy. Typically, there are difficulties attempting to combine any analysis from "words." For example, representations of lexical data derived from real-time automatic speech recognition applied to conversational speech and "behaviors," such as, acoustic measurements related to speakers' non-verbal speaking behavior as both provide different insights. This may result in divergent conclusions, which can confuse a call agent about the next best action.

There are challenges in achieving this combining process, such as (1) acoustic signal processing and automatic speech recognition produce real-time outputs that are asynchronous to one another and which have significantly different latencies, (2) varying accuracy of the application of acoustic signal processing and machine learning algorithms or speech to text in determining behaviors. Thus, there is a need within the prior art to combine the audio and text analysis of an interaction between a call agent and a customer to provide more detailed, refined contextually-aware feedback.

FIG. 1 shows an exemplary system 100 for a real-time words system according to one embodiment of the disclosure. As shown in FIG. 1, platform 102 may be a network managed by a data analysis service provider (e.g., behavioral data such as sensor and usage data), a scalable cloud environment, and a hosted centralized onsite server or the like. Platform 102 may be communicatively coupled with other third-party networks or platforms to provide or perform other services on the data (e.g., audio data) via cloud 132 and/or client network 134.

The platform 102 includes a data collection processor 104, audio database 106 and base 108, which may include various memory and processors for storing and executing instructions. The base 108 includes acoustic processor 110, acoustic database 112, speech processor 114, speech database 116, rules processor 118, rules database 120, natural language processor (NLP) 122, historical processor 124, historical database 126, machine learning (ML) database 128, reporting processor 130, model database 144, model processor 145, training data database 146, behavior training database 148, convolutional neural network (CNN) 150, recurrent neural network (RNN) 152, behavioral model processor 158, context processor 160, context training database 162, topic detection database 170, topic training database 172, call scoring processor 174 and call scoring database 176.

Platform 102 processes (e.g., analyses) received data (e.g., audio data, sensor, and usage data) from one or more user devices 136(a) . . . (n), where "n" is any suitable number, by executing a platform data collector 104 and a platform base, which may include suitable memory and suitable processor, 108 and storing and extracting data from the platform audio database 106. The platform base 108 is typically a processor and memory device that cooperate. The processor portion may include a CPU (central processing unit), integrated electronic circuit that performs operations to achieve a programmed task, and other instructions that may be accessed, or retrieved, from an operating system and executed. The memory portion may include electronic storage registers, ROM, RAM, EEPROM, non-transitory electronic storage medium, volatile memory or non-volatile electronic storage media and/or other suitable computer memory.

The network 134 includes any suitable number of user devices 136, which may be an agent's terminal or a client's, such as a caller's, terminal. An agent may operate a user device 136 and be in communication with platform 102 via any combination of network 134 and/or cloud 132. Thus, an agent can be working at a workstation that is a user device and a client, or caller, or customer, may be calling, or communicating with an agent at an associated user device. The user device may be a laptop, smartphone, PC, tablet or other electronic device that can do one or more of receive, process, store, display and/or transmit data. The user device 136 may have a connection, wired and/or wireless, to a network and/or directly to other electronic devices. A user device may be a telephone that a caller, also referred to as a customer, or referred to as a client, uses to call a location. An agent may be stationed at that location and may communicate with the caller. Thus, the agent station may be more sophisticated with respect to functionality than the caller device, or the agent station may be a smartphone with a graphical user interface (GUI).

The platform data collector 104 can connect to the user device streamer 138, sending a request to the user device streamer 138 for the data stored in the user device user database 140, receiving the data stored in the user device user database 140, stores the received data in the platform audio database 106 and initiates the platform base processor and memory 108.

In some embodiments, the platform data collector 104 may collect audio data from the user device 136, generally, streamed to platform 102 in real-time. The received data may be an audio file that contains the audio data from a call agent's day, past hour, or most recent interaction with a client. The received audio data may be collected from various user devices 136 to allow platform 102 to perform batch processing of audio data from a client network 134 or in real-time for each user device 136.

Figure 18:
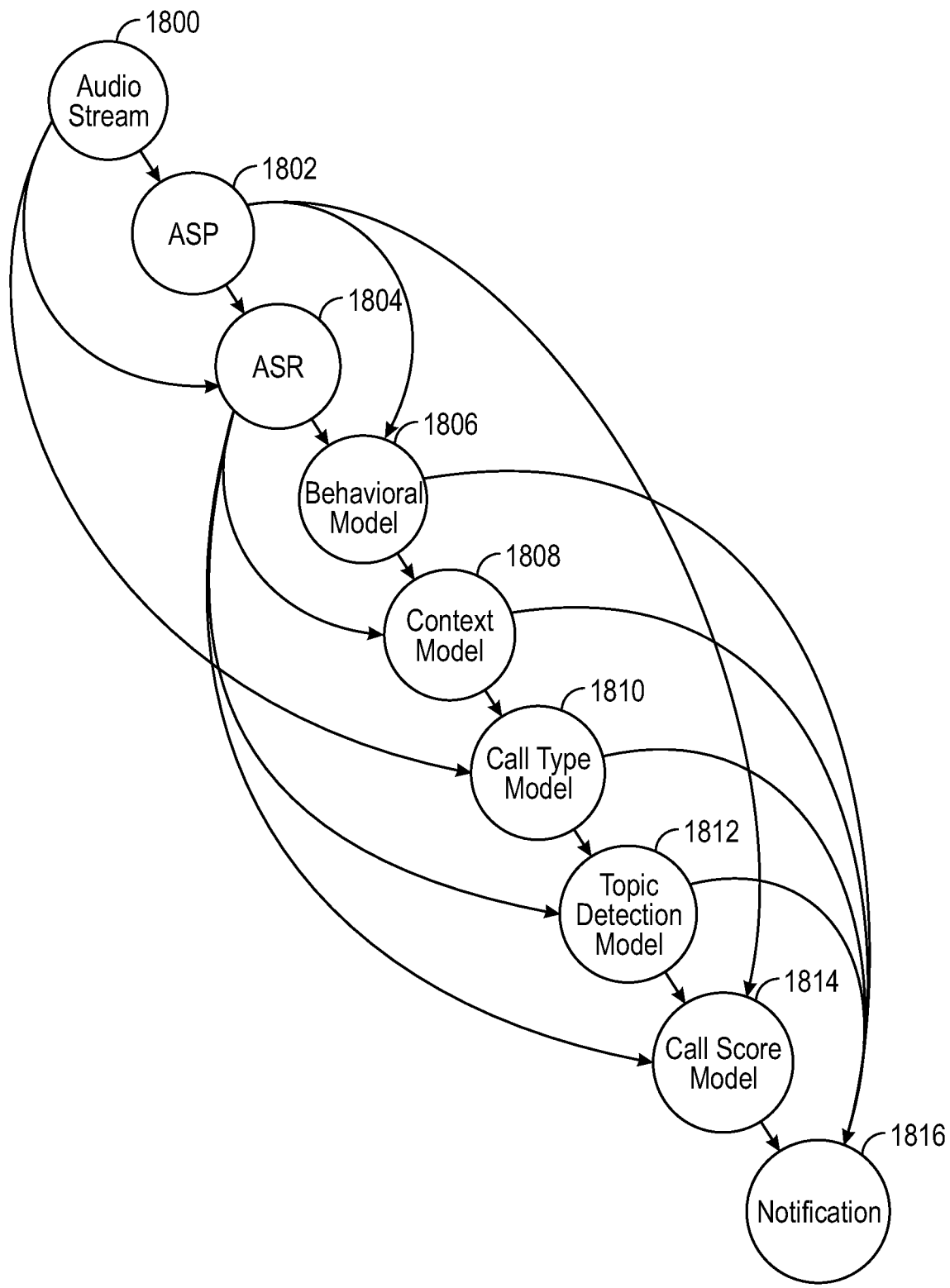
FIG. 18: illustrates an example of a process of a model processor.

The platform data collector 104 may send the received audio stream to the model database 144 to initiate the process such as described relation to FIG. 18. The model database 144 stores various models, such as behavior models, context models, call type models, topic behavior model, ASP, ASR and other suitable models. The platform audio database 106 contains the raw audio data received from the user device user database (user database) 140. For example, the user database 140 can contain a user ID, for example, TS 789654, the company, for example, Comcast, and the audio file, which may be stored as a separate audio file for each call the user completes. In some embodiments, the audio file may be one large file that contains the audio from the agent's, entire workday; the audio data may also be streamed to the platform 102 or server in real-time for real-time analysis performed on the audio data to provide the call agents, also referred to as users herein, with notifications or suggestions during a call or interaction.

The platform base 108 begins by being initiated by the platform data collector 104. It then initiates the platform acoustic processor 110, the platform speech device 114, the platform rules processor 118, the platform NLP (natural language processor) processor 122, the platform historical processor 124, and the platform reporting processor 130. The platform base processor and memory 108 may determine which services the user has access to and limit access to the platform 102 depending on which services the user has access.

The platform acoustic processor 110, which is initiated by the platform base processor and memory 108, queries the platform audio database 106 for a new data entry. For example, a new audio data file received from a user device stream processor 138, then the platform acoustic processor 110 extracts the new data entry from the platform audio database 106, performs a behavior analysis on the new data entry, for example the analysis may be extracting data points from the audio file such as the length of the event, a number, or quantity of speakers were on the audio file, how many words per minute was the agent saying, how many words per minute was the client saying, what was the tone, pitch, or fundamental frequency or waveform frequency of the agent, what was the tone, pitch, or fundamental frequency or waveform frequency of the client, etc. in order to determine if the user, such as a call agent, or client the user is interacting with is feeling happy, anxious, angry, etc., then the platform acoustic processor 110 stores the resulting data from the analysis in the platform acoustic database 112 and returns to the platform base 108. The typical waveform frequency of an adult male is between 85-155 Hz and a typical waveform frequency of an adult female is between 165-255 Hz. This parameter of speech is merely one example of a parameter that may be used to determine an emotional state of a speaker, either agent or customer.

For example, the platform acoustic processor 110 may perform the operation described in step 1806 in FIG. 18. The platform acoustic database 112 contains the resulting data from the analysis performed by the platform acoustic processor 110. The platform acoustic database 112 may contain data points from the audio file such as the length of the event, how many speakers were on the audio file, how many words per minute was the agent saying, how many words per minute were the client saying, what was the tone, pitch, or fundamental frequency or waveform frequency of the agent, what was the tone, pitch, or fundamental frequency or waveform frequency of the client, etc. and the resulting behavior of the user, such as a call agent, and the client the call agent is interacting with.

The platform speech processor 114, which is initiated by the platform base 108, queries the platform audio database 106 for a new data entry, for example a new audio data file received from a user device streamer 138, then the platform speech processor 114 extracts the new data entry from the platform audio database 106, performs a text analysis on the new data entry, for example converting the audio data file into a text data file and comparing each word from the text data file to a database that contains a list of individual words and the resulting behavior of the words use, for example if the client uses words, or phrases such as "thank you", "I understand", "appreciate," etc. and/or variations thereof, then it may be determined that the client is satisfied, this comparison would allow the platform 102 to determine if the user, such as a call agent, or client the user is interacting with is feeling happy, anxious, angry, etc., then the platform speech memory, or database, 116 stores the resulting data from the analysis and returns to the platform base memory and processor 108.

The speech database 116 and speech processor 114, may be used in conjunction, to store text data and to analyze text data and compare text data. Thus, the text data file may be compared to other text data. The text file may also be created from an analysis in which employees of platform 102 read transcriptions of previous interactions and determine the call agent's behavior and determine the keywords that provide the reasoning for the behavior selected. This type of analysis can be extrapolated to create a database of words and associated behaviors. The speech to text conversion or transcript may be produced.

The platform speech database 116 contains the resulting data from the analysis performed by the platform speech processor 114; the platform speech database 116 may contain data points from the audio file such as the length of the event, how many speakers were on the audio file, the number of questions asked by the client, the number of words used associated with anger, politeness, satisfaction, happiness, sadness, etc. and the number of curse words used as well as the resulting behavior of the user, such as a call agent, and the client the call agent is interacting with. Platform rules processor 118 is initiated by the platform base processor and memory 108. Platform rules processor 118 queries the platform acoustic database 112 and the platform speech database 116 for new data entries.

Platform rules processor 118 extracts the new data entries, compares the data entries to the platform rules database 120, extracts the corresponding feedback, for example, if the call agent or client is satisfied, angry, happy, etc., sends the feedback to the platform reporting processor 130, and stores the data in the platform historical database 126. The platform rules processor 118 may determine if the resulting behavior feedback from the platform acoustic database 112, platform speech database 116, and extracted feedback from the platform rules database 120, is a match in which case the feedback sent to the platform reporting processor 130 may contain a stronger recommendation, for example, "client behavior is a 90% match" if only two of the resulting feedback behaviors match the recommendation may be "client behavior is 60% match", to show the different strengths of the feedback provided to the user or call agent.

The platform rules processor 118 may perform the operation described in step 1810 in FIG. 18. The platform rules database 120 is used in the process described in the platform rules processor 118 and is compared to the data from the platform acoustic database 112 and the platform speech database 116 to determine the behaviors of the user and client using the analysis performed on the audio data and the text data, the database may contain a list of audio parameters, such as how many speakers were on the audio file, how many words per minute was the agent saying, how many words per minute was the client saying, what was the tone, pitch, or fundamental frequency or waveform frequency of the agent, what was the tone, pitch, or fundamental frequency or waveform frequency of the client, etc., and text parameters, such as how many speakers were on the audio file, the number of questions asked by the client, the number of words used associated with anger, politeness, satisfaction, happiness, sadness, etc. and the number of curse words used, and the corresponding behavior feedback.

The platform NLP (natural language processor) processor 122 is initiated by the platform base processor and memory 108, queries the platform acoustic database 112 and the platform speech database 116 for a new data entry, extracts the new data entry from the platform acoustic database 112, and the text file from the platform speech database 116. The platform NLP processor 122 performs an NLP analysis on the text file. The platform NLP processor 122 compares the data entry from the platform acoustic database 112 and the NLP analysis to the platform rules database 120, extracts the corresponding feedback, sends the feedback to the platform reporting processor 130, and stores the data in the platform historical database 126.

The Platform NLP processor 122 may perform the operation described in step 1812 in FIG. 18. The platform historical processor 124 filters data accessed from the platform historical database 126 based on the feedback results, selects the first parameter in the platform historical database 126, and filters the database on the selected parameter. The platform historical processor 124 performs correlations on all the other parameter data that has the same feedback results and selected parameter, determines if there was a correlation high enough to be significant, for example, over 90%, stores the data point and feedback results in the platform ML (machine learning) model database 128. The platform historical database 126 is created by storing the resulting data from the platform rules processor 118 and the platform NLP processor 122, which contains the resulting feedback and the analysis data produced by the other processors and memories; the database is used during the process described in the platform historical processor 124, and the database contains the historical data from the resulting analysis from the processes described in the platform rules processor 118 and the platform NLP (natural language processor) processor 122 and the feedback provided to the user.

The platform ML (machine learning) model database 128 contains the resulting data from the process described in the platform historical processor 124. The data stored in the platform ML model database 128 includes highly correlated data points and the resulting feedback. The platform reporting processor 130 continuously polls for the feedback results from the platform rules processor 118 and the platform NLP (natural language processor) processor 122, receives the feedback and then sends the feedback to the user device streamer 138 to be displayed on the graphical user interface (GUI) 142. The platform reporting processor 130 may perform the operation described in step 1816 in FIG. 18. The cloud, or communication network, 132 may be a wired and a wireless network.

The communication network (if wireless) may be implemented using communication techniques such as Visible Light Communication (VLC), Worldwide Interoperability for Microwave Access (WiMAX), Long Term Evolution (LTE), Wireless Local Area Network (WLAN), Infrared (IR) communication; Public Switched Telephone Network (PSTN), radio waves, and other suitable communication techniques. The communication network 132 may allow ubiquitous access to shared pools of configurable system resources and higher-level services that can be rapidly provisioned with minimal management effort, often over the Internet, and rely on sharing resources to achieve coherence economies of scale, like a public utility. Alternatively, third-party clouds enable organizations to focus on their core businesses instead of expending resources on computer infrastructure and maintenance.

The client network 134 includes the various clients of platform 102 that may have a subscription to the services offered by platform 102, the client network 134 may have a plurality of users using user devices 136(*a*) . . . (n), where "n" is any suitable number. These user devices 136 may include devices such as laptops, smartphones, tablets, computers, or smart speakers, or other suitable device. A user device 136, maybe client device and part of the client network 134. User device 136 may contain a user device streamer 138, a user database 140, and may contain a graphical user interface (GUI) 142. The user device streamer 138 begins by connecting to the platform data collection processor, also referred as data collector, 104, receives a request from the platform data collection processor 104 for the user database 140, sends the data stored in the user database 140 to the platform data collection processor 104.

The user device streamer 138 continuously polls for feedback from the platform reporting processor 130. The user device streamer 138 receives feedback from the platform reporting processor 130 and displays the feedback on the GUI 142. The user database 140 contains the raw audio data from the call agent's interaction with a client. For example, the user database 140 contains the user ID, for example, TS 789654, the company, for example, Comcast, and the audio file, which may be stored as a separate audio file for each call the user completes. In some embodiments, the audio file may be one large file that contains the audio from the user's entire workday.

The audio data may also be streamed to platform 102 or server in real-time for real-time analysis performed on the audio data to provide the call agents with notifications or suggestions during a call. The GUI 142, which may include a guided user interface(s) may accept inputs from users or provide outputs to the users or perform both the actions. A user can interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interface(s) may either be implemented as a Command Line Interface (CLI), a Graphical User Interface (GUI), a voice interface, or a web-based user-interface, 142.

Figure 2:
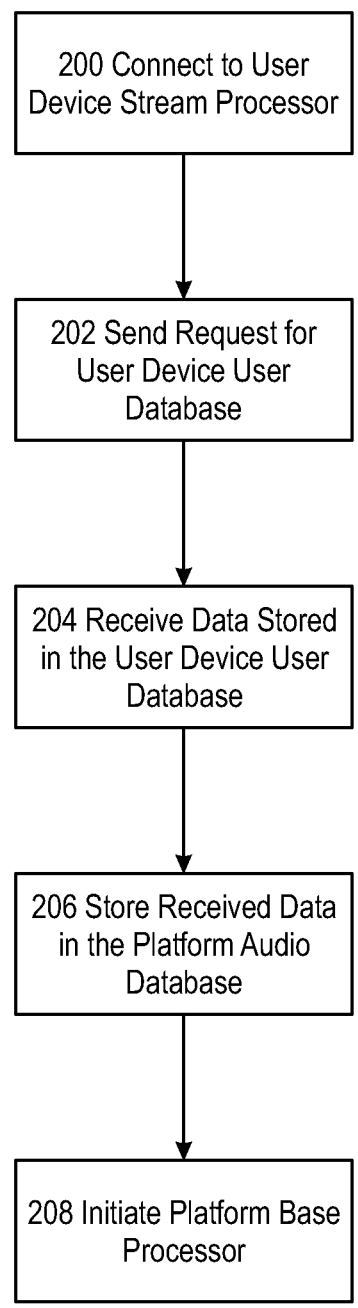
FIG. 2: illustrates an example of a process of a platform data collection processor.

FIG. 2 shows an example of the functioning of the platform data collection processor (shown herein as element 104). The process begins with the platform data collection processor (shown herein as element 104) connecting to the user device streamer (shown herein as element 138), 200. The platform data collection processor (shown herein as element 104) sends a request for the data stored in the user database (shown herein as element 140); for example, the raw audio data may be audio files, a group of audio files, or an audio stream in real-time. In some embodiments, the platform data collection processor (shown herein as element 104) may receive user credentials from the user device streamer (shown herein as element 138) to determine if the user has access to the services offered by platform (shown herein as element 102). For example, user credentials may be a username, such as a series or combination of letters or numbers or an e-mail address such as a company e-mail address or personal e-mail address, in combination with a password, such as a series or combination of letters and numbers, or a biometric password such as a fingerprint, facial recognition, etc., or any combination of these, 202. The platform data collection processor (shown herein as element 104) receives the data stored in the user database (shown herein as element 140) from the user device streamer (shown herein as element 138), 204.

The platform data collection processor (104) stores the received data in the platform audio database (106), 206. The platform data collection processor (104) initiates the platform base (108), 208.

Figure 3:
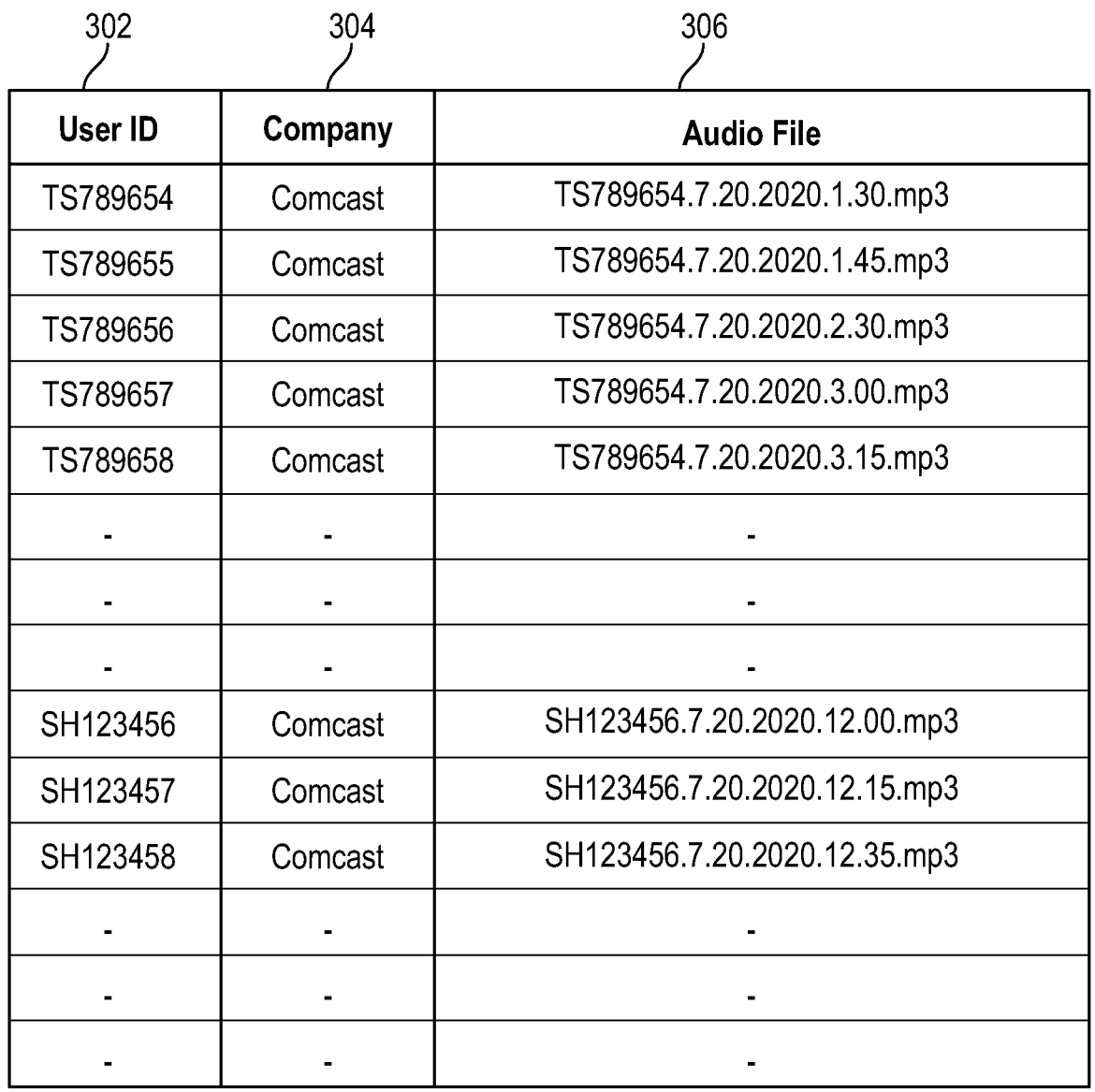
FIG. 3: illustrates an example of a platform audio database.

FIG. 3 shows one example 300 of functioning of the platform audio database (106). Platform audio database (106) can contain the raw audio data received from the user database (140). For example, the database (106) contains and stores the user ID (302), for example, TS 789654, the company (304), for example, Comcast, and the audio file (306), which may be stored as a separate audio file for each call the user completes. The audio file (306) may be one large file that contains the audio from the user's entire workday. The audio data may also be streamed to platform (102) or a server, or other accessible electronic storage location in real-time for real-time analysis performed on the audio data to provide the call agents with notifications or suggestions during a call or interaction.

Figure 4:
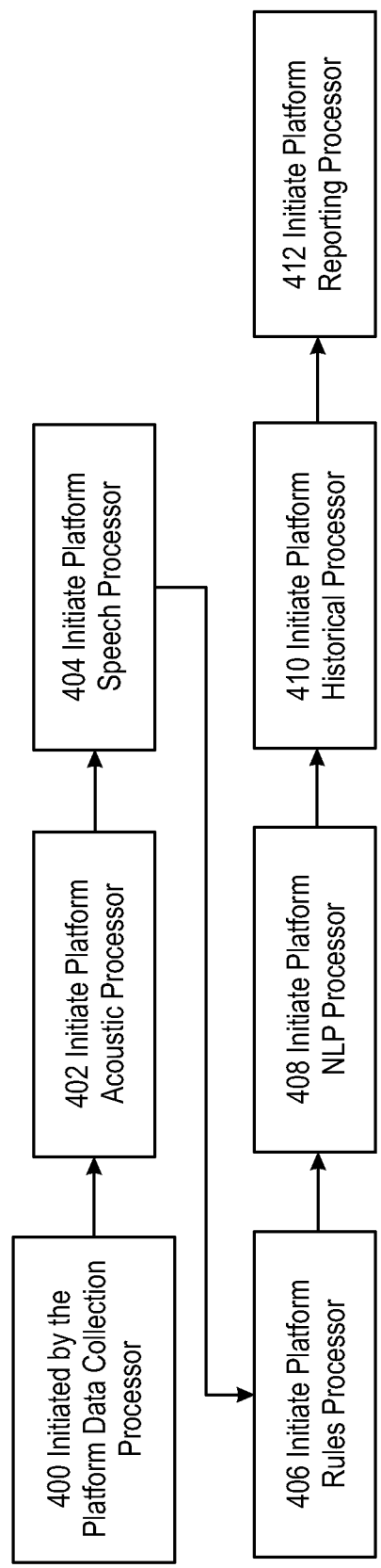
FIG. 4: illustrates an example of a process of a platform base.

FIG. 4 shows an example of functions of the platform base (shown herein as element 108). The platform base (shown herein as element 108) is initiated by the platform data collection processor (shown herein as element 104), 400.

As shown by 402, the platform base (shown herein as element 108) initiates the platform acoustic processor (shown herein as element 110). This process includes performing a query of the platform audio database (shown herein as element 106) for a new data entry, for example a new audio data file received from a user device streamer (shown herein as element 138), then the platform acoustic processor (shown herein as element 110) extracts the new data entry from the platform audio database (shown herein as element 106), performs a behavior analysis on the new data entry, for example the analysis may be extracting data points from the audio file such as the length of the event, how many speakers were on the audio file, how many words per minute was the agent saying, how many words per minute was the client saying, what was the tone, pitch, or fundamental frequency or waveform frequency of the agent, what was the tone, pitch, or fundamental frequency or waveform frequency of the client, etc. in order to determine if the user, such as a call agent, or client the user is interacting with is feeling happy, anxious, angry, etc., then the platform acoustic processor and database (shown herein as elements 110, 112, respectively) stores the resulting data from the analysis in the platform acoustic database (shown herein as element 110) and returns to the platform base (shown herein as element 108).

As shown in 404, the platform base (memory and processor) (shown herein as element 108) initiates the platform speech processor (shown herein as element 114). This process includes performing queries of the platform audio database (shown herein as element 106) for a new data entry, for example a new audio data file received from a user device streamer (shown herein as element 138), then the platform speech processor (shown herein as element 114) extracts the new data entry from the platform audio database (shown herein as element 106), performs a text analysis on the new data entry, for example converting the audio data file into a text data file and comparing each word from the text data file to a database that contains a list of individual words and the resulting behavior of the words use, for example if the client uses words such as "thank you", "I understand", "appreciate", etc. then it may be determined that the client is satisfied, this comparison would allow the platform to determine if the user, such as a call agent, or client the user is interacting with is feeling happy, anxious, angry, etc., then the platform speech processor and/or platform speech database (shown herein as elements 114, 116, respectively) stores the resulting data from the analysis in the platform speech database (shown herein as element 114) and returns to the platform base (shown herein as element 108). The database in which the text data file is compared may be created from an analysis in which platform (shown herein as element 102) reads transcriptions of previous interactions and determines the call agent's behavior and the client's behavior and determines the keywords that provide the reasoning for the behavior selected. This type of analysis can be extrapolated to create a database of words and the associated behaviors.

As shown by 406, the platform base (shown herein as element 108) initiates the platform rules processor (shown herein as element 118). This process includes performing a query of the platform acoustic database (shown herein as element 112) and the platform speech database (shown herein as element 116) for new data entries, extract the new data entries, compares the data entries to the platform rules database (shown herein as element 120), extracts the corresponding feedback, for example, if the call agent or client is satisfied, angry, happy, etc., sends the feedback to the platform reporting processor (shown herein as element 130), and stores the data in the platform historical database (shown herein as element 126). The platform rules processor (shown herein as element 118) may determine if the resulting behavior feedback from the platform acoustic database (shown herein as element 112), platform speech database (shown herein as element 116), and extracted feedback from the platform rules database (shown herein as element 120), is a match in which case the feedback sent to the platform reporting processor (shown herein as element 130) may contain a stronger recommendation, for example, "client behavior is a 90% match" if only two of the resulting feedback behaviors match the recommendation may be "client behavior is 60% match", to show the different strengths of the feedback provided to the user or call agent.

As shown by 408, the platform base, including memory and processor (shown herein as element 108) initiates the platform NLP processor (shown herein as element 122). This process 408, includes performing a query of the platform acoustic database (shown herein as element 112) and the platform speech database (shown herein as element 116) for a new data entry, extracts the new data entry from the platform acoustic database (shown herein as element 112), and the text file from the platform speech database (shown herein as element 116). The platform NLP processor (shown herein as element 122) performs an NLP analysis on the text file.

Also included in the process 408 is that the platform NLP processor (shown herein as element 122) compares the data entry from the platform acoustic database (shown herein as element 112) and the NLP analysis to the platform rules database (shown herein as element 120), extracts the corresponding feedback, sends the feedback to the platform reporting processor (shown herein as element 130), and stores the data in the platform historical database (shown herein as element 126).

As shown by 410, the platform base (shown herein as element 108) initiates the platform historical processor (shown herein as element 124). This process 410 includes filtering filters the platform historical database (shown herein as element 126) based on the feedback results, selects the first parameter in the platform historical database (shown herein as element 126), and filters the database on the selected parameter. The platform historical processor (shown herein as element 124) performs correlations on all the other parameter data that has the same feedback results and selected parameter, determines if there was a correlation high enough to be significant, for example, over 90%, stores the data point and feedback results in the platform ML model database.

As shown by 412, the platform base, including memory and processor, (shown herein as element 108) initiates the platform reporting processor (shown herein as element 130). The platform reporting processor (130) is continuously polling for the feedback results from the platform rules processor (shown herein as element 118) and the platform NLP processor (shown herein as element 122), receives the feedback and then sends the feedback to the user device streamer (shown herein as element 138) to be displayed on the GUI (shown herein as element 142).

Figure 5:
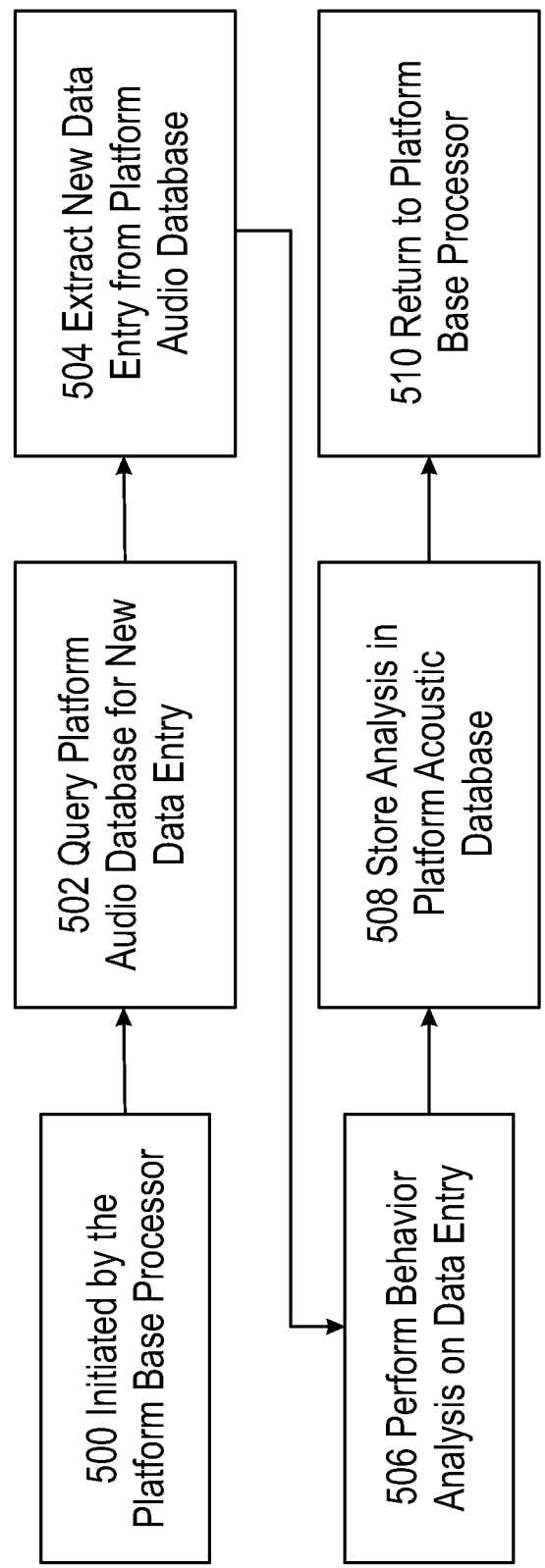
FIG. 5: illustrates an example of a process of a platform acoustic processor.

FIG. 5 shows an example of functioning of the platform acoustic processor (shown herein as element 110). The process, as shown by 500, begins with the platform acoustic processor (shown herein as element 110) being initiated by the platform base (shown herein as element 108).

Next as shown by 502, the platform acoustic processor (shown herein as element 110) queries the platform audio database (shown herein as element 106) for a new data entry. For example, when the platform data collection processor (shown herein as element 104) receives the audio data stored in the user database (shown herein as element 140) from the user device streamer (shown herein as element 138), the platform data collection processor (shown herein as element 104) stores the new audio data in the platform audio database (shown herein as element 106), then the platform acoustic processor (shown herein as element 110) queries the platform audio database (shown herein as element 106) for the new data or the new data entries, which contain the audio file of the interaction between a call agent and the customer.

Next as shown by 504, the platform acoustic processor (shown herein as element 110) extracts the new data entry from the platform audio database (shown herein as element 106); for example, the platform acoustic processor (shown herein as element 110) extracts the User ID, such as TS789654, the company, such as Comcast, and the audio file, such as TS789654.7.20.2020.1.30.mp3. In some embodiments, the audio file may be a stream of audio data sent to the platform acoustic processor (110). In some embodiments, the audio file or audio stream may contain a timestamp or other metadata such as the number of speakers on the call, the customer's information such as name, address, current services, payment, and bill status, subject of the interaction such as loss of service, late payment, general questions, etc.

As shown by 506, the platform acoustic processor (110) performs behavioral analysis on the new data entry extracted from the platform audio database (106). For example, the analysis may be extracting data points from the application of acoustic signal processing. Machine learning algorithms analyze audio data file such as the length of the event, how many speakers were on the audio file, how many words per minute was the agent saying, how many words per minute was the client saying, what was the tone, pitch, or fundamental frequency or waveform frequency of the agent, what was the tone, pitch, or fundamental frequency or waveform frequency of the client, etc. In some embodiments, the platform data collection processor (104) may only receive an application of acoustic signal processing, and machine learning algorithms analyze audio files that do not contain metrics or metadata on the application of acoustic signal processing and machine learning algorithms analyze audio file in which case this analysis can be performed. For example, the platform acoustic processor (110) may take the application of acoustic signal processing. Machine learning algorithms analyze the audio file and determine essential metrics from the application of acoustic signal processing, and machine learning algorithms analyze audio data file such as the length of time of an event or a phone call, the pace of the agent, the pace of the client or customer, the fundamental frequency or waveform frequency of the agent, the fundamental frequency or waveform frequency of the client, etc.

Machine learning models are continuously being refined and stored in the models database 144. Typically, machine learning training does not occur in real-time. The use, or application, of previously trained machine learning models occurs in real-time. Retraining and refinement of models occurs offline (ideally in an automated, scheduled fashion).

An annotation method may include agents listening manually to the audio file to determine the metrics or determine measurements that may be used to create models to allow newly received or acquired application of acoustic signal processing and machine learning algorithms analyzed audio data to be compared to the developed models in order determine the emotions or mental state of a call agent or customer or client.

The platform acoustic processor (110) may perform the operation described in step 1806 in FIG. 18. As shown by 508, the platform acoustic processor (110) can store the results from the analysis in the platform acoustic database (112). For example, the platform acoustic processor (110) can store the general data such as the Agent ID, company, and audio file in the platform acoustic database (112). Also, the platform acoustic processor (110) stores the length of the event, how many speakers were on the audio file, how many words per minute was the agent saying, how many words per minute were the client saying, what was the tone, pitch, or fundamental frequency or waveform frequency of the agent, what was the tone, pitch, or fundamental frequency or waveform frequency of the client, the average decibel level of the agent, the average decibel level of the client, etc., in the platform acoustic database (112). As shown by 510, the platform acoustic processor (110) can return to the platform base 108.

FIG. 6 shows an example of the platform acoustic database (112), 600. The platform acoustic database (112) is used to store the data resulting from the analysis performed in the platform acoustic processor (110). The platform acoustic database (112) contains general data 602, that may be the user IDs 604, the company 606, and acoustic signal processing and machine learning algorithms analyzed audio data files, 608. The platform acoustic database (112) also contains various parameter data such as event time 612, agent's pace or words were spoken per minute 614, client pace or words were spoken per minute 616, agent average fundamental frequency or waveform frequency 618, client average fundamental frequency or waveform frequency 620, average decibel level of the agent 622, or the average decibel level of the client 624. The platform acoustic database (112) may contain a timestamp of the interaction between the agent and the client, which may be when the interaction began and may also include when the interaction was over. Associated metadata may be presented or stored as the interaction progresses; for example, instead of storing the averages of the agent fundamental frequency or waveform frequency, client fundamental frequency or waveform frequency, agent decibel level, client decibel level, the data may be stored for each of the parameters as the interaction progresses and providing a timestamp for every second of the call to determine if there are large differences within the metadata as the interaction progresses.

Figure 7:
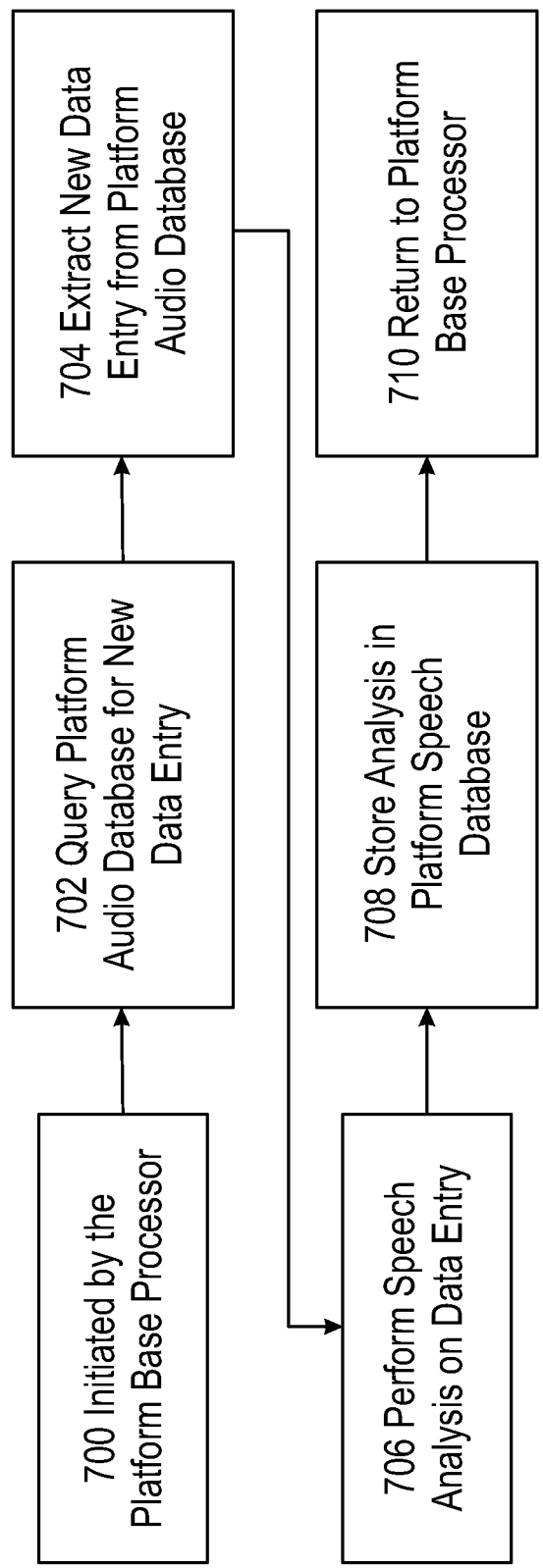
FIG. 7: illustrates an example of a process of a platform speech processor.

FIG. 7 shows an example of the functioning of the platform speech processor (114). As shown by 700, the platform speech processor (114) is initiated by the platform base (108). Then, as shown by 702, the platform speech processor (114) queries the platform audio database (106) for a new data entry. This process 702 includes, for example, when the platform data collection processor (104) receives the audio data stored in the user database (140) from the user device streamer (138), the platform data collection processor (104) stores the new audio data in the platform audio database (106), then the platform speech processor (114) queries the platform audio database (106) for the new data or the new data entries, which contain the audio file of the interaction between a call agent and the customer.

Next, as shown by 704, the platform speech processor (114) extracts the new data entry from the platform audio database (106) for example, the platform speech processor (114) extracts the user ID TS789654, the company, such as Comcast, and the audio file, such as TS789654.7.20.2020.1.30.mp3. The platform speech processor (114) may query the platform acoustic database (112) for the new data entry of the application of acoustic signal processing and machine learning algorithms analyzed audio data to use the application of acoustic signal processing and machine learning algorithms analyzed audio data for the analysis. The audio file may be a stream of audio data sent to the platform speech processor (114). The audio file or audio stream may contain a timestamp or other metadata such as the number of speakers on the call, the customer's information such as name, address, current services, payment, and bill status, subject of the interaction such as loss of service, late payment, general questions, etc.

Next, as shown by 706, the platform speech processor (114) performs a speech analysis on the new data entry extracted from the platform audio database (106). For example, the platform speech processor (114) may use an NLP, or Natural Language Processor, to convert the application of acoustic signal processing and machine learning algorithms analyzed audio data into speech to text-processed data be stored as a speech to text processed data file. The speech to text processed data file may then be compared to a series of databases to determine keywords and phrases used by the call agent and client or customer that the agent is speaking with to determine what is being said during the conversation. For example, the speech to text processed data file may be compared to a curse words database to determine if the call agent or client is cursing, which may conclude that the speaker is angry. Also, the speech to text processed data file may be compared to a database of polite words such as "thanks," "your welcome," "appreciate," etc., to determine that the speaker is pleased or satisfied during the interaction. Depending on the types of words used during the interaction, the results may determine the client's emotional state. For example, suppose the client or customer that the call agent is speaking with uses two or more curse words during the interaction. In that case, it may be determined that the client or customer is angry due to the high amount of curse words used, and this determination or feedback would be stored in the platform speech database (116). The platform speech processor (114) may perform the operation described in step 1808 in FIG. 18.

Next as shown by 708, the platform speech processor (114) stores the results from the analysis in the platform speech database (116). For example, the results may include the general data from the audio file such as the agent ID, the company and the audio data and the text file of the speech to text conversion of the audio file, or in some embodiments, the application of acoustic signal processing and machine learning algorithms analyzed audio data file may be stored in the database as well. The data stored in the platform speech database (116) may also include parameter data such as the number of questions a customer asks a call agent, the number of anger words used by the customer, the number of polite words used by the customer, or the number of curse words used by the customer.

Next, as shown by 710, the platform speech processor (114) returns to the platform base (108).

FIG. 8 shows an example of the functioning of the platform speech database (116). The platform speech database (116) stores the resulting data from the analysis performed during the platform speech processor (114). The platform speech database (116) contains general data, 802, that may be the user IDs 804, the company 806, the application of acoustic signal processing and machine learning algorithms analyzed audio data file 808, and the text file 828 of applying acoustic signal processing and machine learning algorithms analyzed audio data. The platform speech database (116) may also contain various parameter data 826, such as the number of questions a customer asks a call agent 830, the number of anger words used by the customer 832, the number of polite words used by the customer 834, or the number of curse words used by the customer 836.

Figure 9:
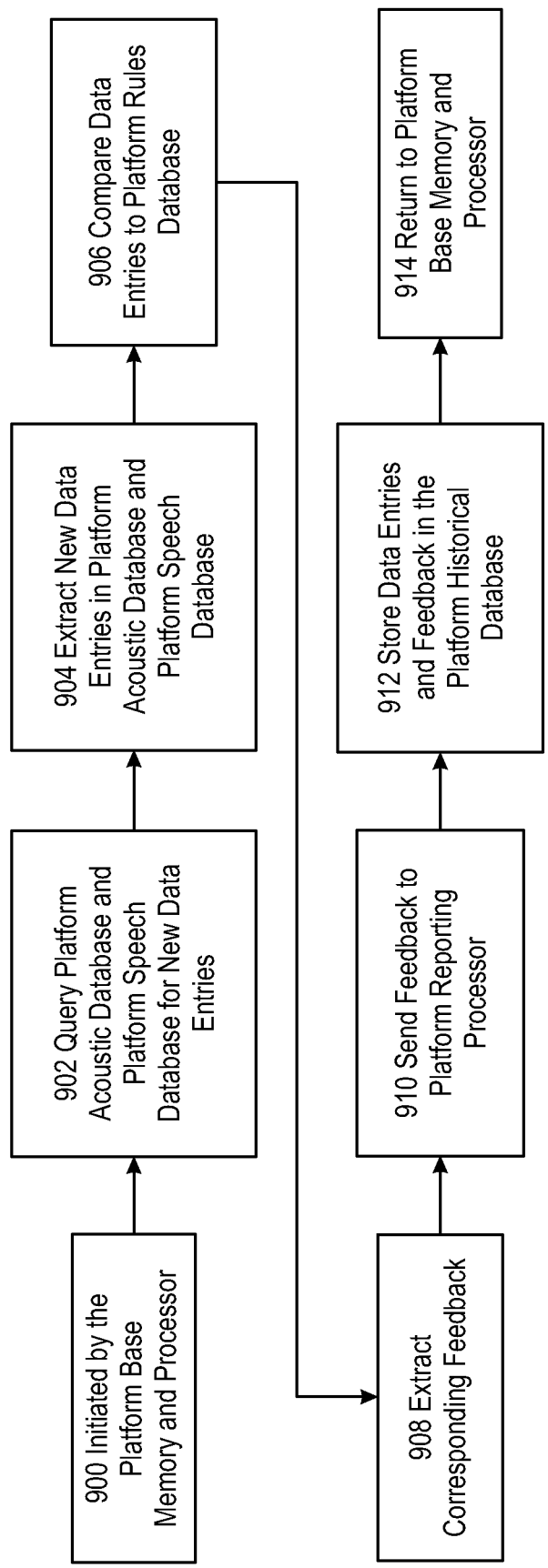
FIG. 9: illustrates an example of a process of a platform rules processor.

FIG. 9 shows an example of the functioning of the platform rules processor (118). At 900, the platform base (108) initiates the platform rules processor and memory (118).

Next at 902, the platform rules processor (118) queries the platform acoustic database (112) and the platform speech database (116) for new data entries. For example, the platform acoustic processor (110) performs behavioral analysis on the audio data stored in the platform audio database (106) and stores the results of the analysis in the platform acoustic database (112), which contains the general data, which may be the user IDs, the company, and the application of acoustic signal processing and machine learning algorithms analyzed audio data file. The platform acoustic database (112) can also contain various parameter data such as event time, agent's pace or words were spoken per minute, client pace or words were spoken per minute, agent average fundamental frequency or waveform frequency, client average fundamental frequency or waveform frequency, average decibel level of the agent, or the average decibel level of the client. The platform speech processor (114) performs a behavior analysis on the speech to text processed application of acoustic signal processing and machine learning algorithms analyzed audio data file and stores the results in the platform speech database (116), which contains user IDs, the company, in the application of acoustic signal processing and machine learning algorithms analyzed audio data file. The text file of the application of acoustic signal processing and machine learning algorithms analyzed audio data. The platform speech database (116) may also contain various parameter data such as the number of questions a customer asks a call agent, the number of anger words used by the customer, the number of polite words used by the customer, or the number of curse words used by the customer.

Next, at 904, the platform rules processor (118) can extract the new data entries in the platform acoustic database (112) and the platform speech database (116). For example, the platform rules processor (118) can extract the new data entry in the platform acoustic database (112), such as the user IDs, the company, and acoustic signal processing and machine learning algorithms analyzed audio data file. The platform acoustic database (112) can also contain various parameter data such as event time, agent's pace or words were spoken per minute, client pace or words were spoken per minute, agent average fundamental frequency or waveform frequency, client average fundamental frequency or waveform frequency, the average decibel level of the agent, or the average decibel level of the client. Also, the platform rules processor (118) can extract the new data entry in the platform speech database (116), such as the user IDs, the company, in the application of acoustic signal processing and machine learning algorithms analyzed audio data file, and the text file of the application of acoustic signal processing and machine learning algorithms analyzed audio data. The databases (112, 116) may also contain various parameter data such as the number of questions a customer asks a call agent, the number of anger words used by the customer, the number of polite words used by the customer, or the number of curse words used by the customer.

Next at 906, the platform rules processor (118) compares the extracted data entries from the platform acoustic database (112) and platform speech database (116) to the platform rules database (120). For example, if one of the behavioral parameters is that the agent is speaking at a pace of fewer than 125 words per minute and if one of the speeches to text processed data parameters is if the client or customer uses two or more anger words during the interaction the corresponding rule that is extracted would be for the agent to speak faster, which may be sent to the GUI (142) as a notification or message through the platform reporting processor (130). For example, suppose one of the behavioral parameters is that the agent's average decibel level is less than 40 dB, and there is no text parameter. In that case, the corresponding rule extracted and provided as feedback to the call agent speaks louder. For example, suppose there is no behavioral parameter, and the text parameter is that the client is asking more than three questions per minute. The corresponding rule extracted and provided as feedback to the call agent is the customer is confused, and the call agent needs to provide more detailed answers. For example, if the behavioral parameter is the agent's decibel level is greater than 85 dB at any moment, and the text parameter is more than one curse word, the corresponding rule that is extracted and provided as feedback to the call agent is to speak softer.

Next at 908, the platform rules processor (118) extracts the corresponding feedback in the platform rules database (120). For example, if one of the behavioral parameters is that the agent is speaking at a pace of fewer than 125 words per minute and if one of the speech to text processed data parameters is if the client or customer uses two or more anger words during the interaction, the corresponding rule that is extracted would be for the agent to speak faster, which may be sent to the GUI (142) as a notification or message through the platform reporting processor (130). For example, suppose one of the behavioral parameters is that the agent's average decibel level is less than 40 dB, and there is no text parameter. The corresponding rule extracted and provided as feedback to the call agent speaks louder. For example, suppose there is no behavioral parameter, and the text parameter is that the client is asking more than three questions per minute. The corresponding rule extracted and provided as feedback to the call agent is the customer is confused, and the call agent needs to provide more detailed answers.

For example, if the behavioral parameter is the agent's decibel level is greater than 85 dB at any moment, and the text parameter is more than one curse word, the corresponding rule that is extracted and provided as feedback to the call agent is to speak softer.

Next at 910, then the platform rules processor (118) sends the feedback to the platform reporting processor (130). For example, if the platform rules processor (118) extracts the feedback that the agent should speak louder, speak softer, or the customer is confused, provide more details, the feedback is sent to the platform reporting processor (130).

Next at 912, the platform rules processor (118) stores the extracted data entries from the platform acoustic database (112) and the platform speech database (116). The extracted feedback from the platform Rules database (120) in the platform historical database (126). For example, the platform rules processor (118) extracts the data entry that was used to determine the feedback that is sent to the platform reporting processor (130), such as if the behavioral parameter is that the agent is speaking at a pace of fewer than 125 words per minute and if the speech to text processed data parameters is if the client or customer uses two or more anger words during the interaction. If the extracted feedback is for the agent to speak faster, this data would be stored in the platform historical database (126). For example, if one of the behavioral parameters is that the agent's average decibel level is less than 40 dB, and there is no text parameter, and if the extracted feedback is to the call agent is to speak louder, then this data would be stored in the platform historical database (126). For example, if there is no behavioral parameter, and the text parameter is that the client is asking more than three questions per minute, and if the call agent's extracted feedback is confused. The call agent needs to provide more detailed answers, then this data is stored in the platform historical database (126).

Next at 912, the platform rules processor (118) returns to the platform base (108), 914. The platform rules processor (118) may perform the operation described in step 1810 in FIG. 18.

FIG. 10 shows an example of the functioning of the platform rules database (120). The platform rules database (120), which contains rules and corresponding feedback that is used by the platform rules processor (118), and platform NLP processor (122), which allows the modules to compare the data stored in the platform acoustic database (112), platform speech database (116), and results from the analysis performed by the platform NLP processor (122) to determine the feedback that will be sent to the user device (136). The platform rules database (120) may be created by administrators, executives, managers, etc., of platform (102) to determine the rules that would prompt notifications to be sent to a call agent based on the modules' analysis. The platform rules database (120) may contain a behavior parameter 1010, which is the parameter determined during the analysis performed by the platform acoustic processor (110), a speech to text processed data parameter 1026, which is the parameter determined during the analysis performed by the platform speech processor (114), an NLP parameter 1040, which is a parameter, or an analysis performed by the platform NLP processor (122). For example, the platform rules processor (118) may use the behavioral parameters and speech to text processed data parameters stored in the platform acoustic database (112) and the platform speech database (116) to be compared to the platform rules database (120), so if there is a behavior parameter of the client frequency waveform over 350 Hz (i.e., speaking very loudly or shouting, yelling, etc.) with a speech to text processed parameter of using more than two curse words and the customer had a negative interaction. The corresponding feedback 1042 would be to "transfer a call to a supervisor, the customer is very angry," which is a notification or message sent to the call agent to assist the client, element 1000.

Figure 11:
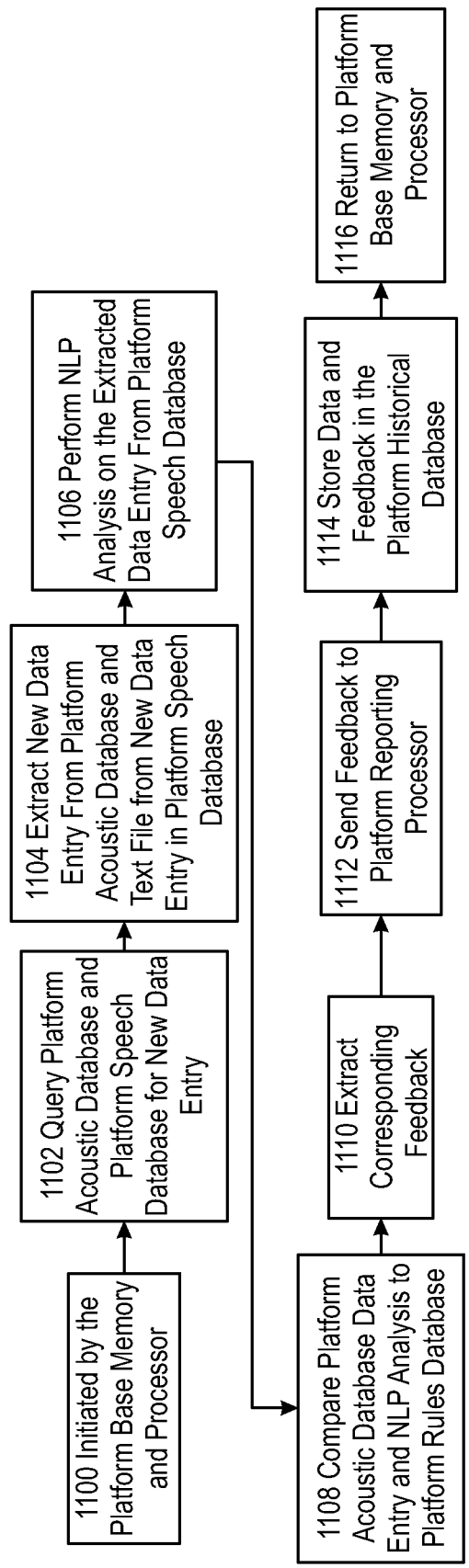
FIG. 11: illustrates an example of a process of a platform NLP (natural language processor) processor.

FIG. 11 shows an example of the functioning of the platform NLP processor (122). As shown by 1100, the platform base (108) initiates the platform NLP processor (122). Next, as shown by 1102, the platform NLP processor (122) queries the platform acoustic database (112) and the platform speech database (116) for a new data entry. For example, the platform acoustic processor (110) performs behavioral analysis on the audio data stored in the platform audio database (106) and stores the results of the analysis in the platform acoustic database (112), which contains the general data, which may be the user IDs, the company, and the application of acoustic signal processing and machine learning algorithms analyzed audio data file. The database also contains various parameter data such as event time, agent's pace or words were spoken per minute, client pace or words were spoken per minute, agent average fundamental frequency or waveform frequency, client average fundamental frequency or waveform frequency, average decibel level of the agent, or the average decibel level of the client. The platform speech processor (114) performs a behavior analysis on the speech to text processed application of acoustic signal processing and machine learning algorithms analyzed audio data file and stores the results in the platform speech database (116), which contains user IDs, the company, in the application of acoustic signal processing and machine learning algorithms analyzed audio data file. The text file of the application of acoustic signal processing and machine learning algorithms analyzed audio data. The database may also contain various parameter data such as the number of questions a customer asks a call agent, the number of anger words used by the customer, the number of polite words used by the customer, or the number of curse words used by the customer.

Next, as shown by 1104, the platform NLP processor (122) can extract the new data entry from the platform acoustic database (112) and the speech to text processed data file from the new data entry in the platform speech database (116). For example, the platform NLP processor (122) extracts the new data entry in the platform acoustic database (112), such as the user IDs, the company, and acoustic signal processing machine learning algorithms analyzed audio data file. The database also contains various parameter data such as event time, agent's pace or words were spoken per minute, client pace or words were spoken per minute, agent average fundamental frequency or waveform frequency, client average fundamental frequency or waveform frequency, the average decibel level of the agent, or the average decibel level of the client.

The platform NLP processor (122) can extract the speech to text processed data file from the platform speech database (116).

Next, as shown by 1106, the platform NLP processor (122) performs an NLP analysis on the extracted text file from the data entry from the platform speech database (116). For example, the NLP analysis may be creating a summary of the conversation from the speech to text processed data by removing words that are determined to be filler words, such as "like," "um," "ah," repeated words, etc. to make the transcription easier to read. This may be accomplished by comparing the speech to text processed data to a database containing filler words to remove them from the transcription.

The NLP analysis may have the rule to remove repeated words within the transcript. Also, the NLP analysis may highlight important keywords within the transcript, and this may be accomplished by comparing the transcript to a database that has important keywords for a user, executive, management, or company, such as words or phrases that are considered consistent issues or problems that customers have, services offered by the company, etc., so that the summary of the interaction or call highlights the important keywords to allow a reader to understand the context of the call better.

The NLP analysis may also perform a sentiment analysis in which the platform NLP processor (122) identifies, extracts, and quantifies affective states and subjective information such as the portion of the transcript that includes customer surveys, customer responses, which is useful to determine if the customer's language has a negative or positive connotation associated with it. This portion of the analysis may determine if the customer had a negative or positive interaction with a call agent by determining if the customer's language had more positive words or more negative words used during interaction.

Next, as shown by 1108, the platform NLP processor (122) may perform the operation described in step 1812 in FIG. 18. The platform NLP processor (122) compares the data entry from the platform acoustic database (112) and the NLP analysis on the text file from the data entry from the platform speech database (116) to the platform Rules database (120). For example, if one of the behavioral parameters is that the agent is speaking at a pace of more than 165 words per minute and if one of the speech to text processed data parameters is if the client or customer asks more than four questions during the interaction, and it is determined through the NLP analysis that the customer had a positive interaction, then corresponding feedback that is extracted is for the call agent to provide additional details on other services provided by the platform 102 since it is determined that based on how much the agent is talking, how many questions the customer is asking. With a positive interaction, the customer would be interested in hearing additional offers and services.

For example, if one of the behavioral parameters is that the agent's average fundamental frequency or waveform frequency is greater than 350 Hz. The text parameter is that the customer has used two or more curse words. The customer has a negative interaction. The corresponding feedback is for the call agent to transfer the call to a supervisor since it is determined that the customer is very angry.

Next as shown by 1110, then the platform NLP processor (122) extracts the corresponding feedback from the platform Rules database (120). For example, comparing the behavioral parameters, text parameters, and the NLP parameters to the platform rules database (120), the platform NLP processor (122) extracts the corresponding feedback such as provide additional information on other services offered, transfer the call to a supervisor because the customer is very angry, etc.

Next, as shown by 1112, the platform NLP processor (122) sends the feedback to the platform reporting processor (130). For example, the platform NLP processor (122) sends the feedback of providing additional information on other services offered, transfer the call to a supervisor because the customer is very angry, etc., to the platform reporting processor (130).

Next, as shown by 1114, the platform NLP processor (122) stores the extracted data entry from the platform acoustic database (112) and the NLP analysis on the text file from the extracted data entry from the platform speech database (116) and the extracted feedback from the platform rules database (120) in the platform historical database (126). For example, the platform NLP processor (122) stores the agent's behavioral parameter is speaking at a pace of more than 165 words per minute. The speech to text processed data parameters is if the client or customer asks more than four questions during the interaction and has a positive interaction. The call agent's corresponding feedback to provide additional details on other services provided is stored in the platform historical database (126). For example, suppose the behavioral parameter is that the agent's average fundamental frequency or waveform frequency is greater than 350 Hz. The text parameter is that the customer has used two or more curse words. The customer has a negative interaction. The corresponding feedback is for the call agent to transfer the call to a supervisor since it is determined that the customer is very angry. In that case, this data is stored in the platform historical database (126).

Then, as shown by 1116, the platform NLP processor (122) returns to the platform base 108.

Figure 12:
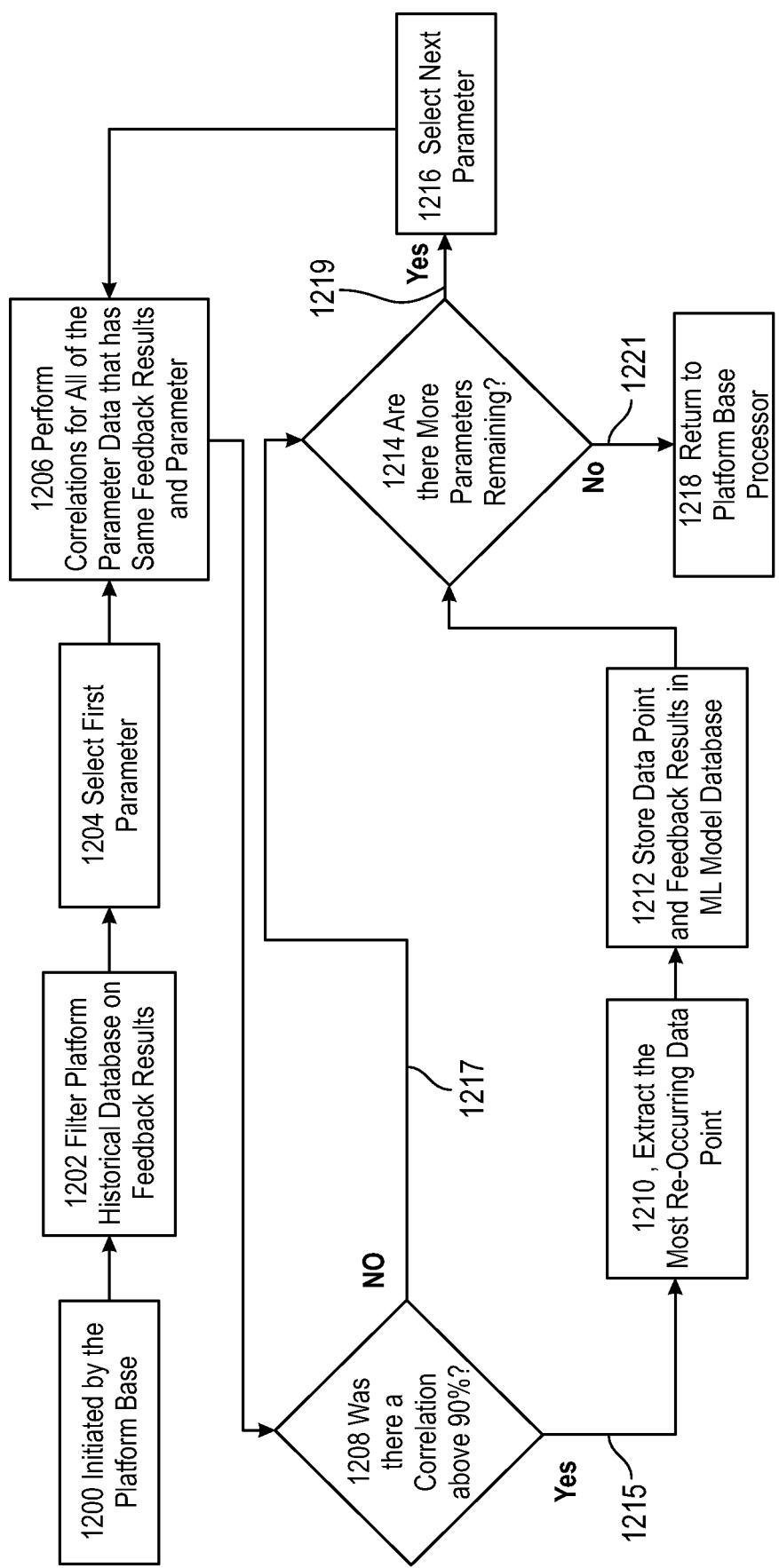
FIG. 12: illustrates an example of a process of a platform historical processor.

FIG. 12 shows an example of the functioning of the platform historical processor (124). The process begins with the platform historical processor (124) being initiated by the platform base (108), 1200.

As shown by 1202, the platform historical processor (124) filters the platform historical database (126) on the feedback results. For example, the platform historical processor (124) filters the platform historical database (126) on the feedback results, such as the customer is angry, agent speak slower, agent says faster, etc., at step 1202. The platform historical processor (124) selects the first parameter and filters the platform historical database (126) on the selected parameter. For example, the platform historical processor (124) filters the platform historical database (126) on the feedback result of the customer is angry and then filters the platform historical database (126) on the first parameter is the behavioral parameter, which may be the event time, agents pace, or words spoken per minute, client pace or words have spoken per minute, agent average fundamental frequency or waveform frequency, client average fundamental frequency or waveform frequency, the average decibel level of the agent, or the average decibel level of the client, etc. For example, the database may be filtered on the customer's feedback because the first parameter being the event time is 15 minutes.

As shown by 120, platform historical processor (124) performs correlations for other parameters with the same feedback and selected parameter. For example, the data that is filtered by the feedback result of the customer being angry and the event time being 15 minutes and finding the various correlations within various other parameters that have the same feedback result and the event time is 15 minutes such as the agent's pace or agent's words spoken per minute, client's pace or the client's words spoken per minute, the agent's average fundamental frequency or waveform frequency, the client's average fundamental frequency or waveform frequency, the number of questions a customer asks a call agent, the number of anger words used by the customer, the number of polite words used by the customer, or the number of curse words used by the customer. etc.

An example of non-correlated parameters, maybe with the feedback result of the customer being angry. The event time being 15 minutes with the number of questions asked by the client with a correlation coefficient of 15%, which is below the 95% threshold, and would be determined to be statistically insignificant or not of importance. Therefore, there is no correlation, and no data points should be extracted. For example, suppose the client is determined to be angry. In that case, they may ask a varying number of questions, such as one person may ask many questions to try and prove their side of an argument, whereas other customers may ask very few problems when they are angry. An example of correlated parameters is with the feedback result of the customer is angry. The event time being 15 minutes with the client's average decibel level with a correlation coefficient of 96%, which is above the 95% threshold, and therefore is highly correlated, which is to be determined to be of statistical importance and the most re-occurring data point (i.e., client's average decibel level is over 65 dB for an event that is 15 minutes) needs to be extracted and stored in the platform ML Model Database (128).

As shown by 1208, the platform historical processor (124) determines if there was a correlation above a predetermined threshold, for the example above 90%, to determine if the correlation is statistically significant; if there was no correlation, then the process continues to step 1214. If it is determined that there was a correlation above a predetermined threshold or that the correlation was statistically significant, shown by "yes" 1215 shows that as shown in step 1210, then the platform historical processor (124) extracts the most re-occurring data point; for example, if the customer is angry for a 15 minute event time, the client's average decibel level is over 65 dB. The platform historical processor (124) stores the extracted data point and the feedback results in the platform ML model database (128); for example, the data point stored is the client's average decibel level is over 65 dB during a 15-minute event when the customer is angry, 1212. Then the platform historical processor (124) determines if more parameters are remaining, 1214.

If it is determined that more parameters are staying, "yes" 1219 shows the platform historical processor (124) selects the next parameter, 1216. If it is determined that there are no more parameters remaining, "no" 1221, then the process returns to the platform base (108), 1218.

FIG. 13 shows an example of the functioning of the platform historical database (126). FIG. 13 shows an embodiment of the platform historical database (126), which is stores the resulting data from the processes described in the platform rules processor (118) and the platform NLP processor (122), which contains the general data from the user's original audio file, behavior parameters, and text parameters, in some embodiments the database may also contain the data from the NLP analysis performed in the platform NLP processor (122). The platform historical database (126) may be used in the process described in the platform historical processor (124) to extract relevant data points from the historical data to improve further the machine learning models of the platform to enhance the feedback sent to the call agents. The platform historical database (126) contains general data 1302 that may be the user IDs 1304, the company 1306, and acoustic signal processing and machine learning algorithms analyzed audio data files 1308. The platform historical database (126) also contains various parameter data 1310 such as event time 1312, agent's pace or words were spoken per minute 1314, client pace or words were spoken per minute 1316, agent average fundamental frequency or waveform frequency 1318, client average fundamental frequency or waveform frequency 1320, average decibel level of the agent 1322, or the average decibel level of the client 1324. The platform historical database (126) may also contain various parameter data 1344 such as the number of questions a customer asks a call agent 1348, the number of anger words used by the customer 1350, the number of polite words used by the customer 1352, or the number of curse words used by the customer 1354. Also shown are feedback reads 1356, which describe a customer's perceived status, such as confused, satisfied, angry, etc.

FIG. 14, shows an example of the functioning of the platform ML model database (128). The platform ML model database (128) stores the relevant data points highly correlated or determined to be statistically significant from the process described in the platform historical processor (124). The database (128) contains the behavioral parameter 1450, the text parameter 1454, and the resulting feedback 1452. In some embodiments, the database (128) may contain parameters from the NLP analysis. The database (128) may further improve the data stored in the platform rules database (120) by determining the highly correlated data points that determine the call agents' feedback. The platform ML model database (128) may include or be in communication with a model database (144), containing the machine learning models resulting in the processes described in the model database (144). The models stored in models database (144) include behavior model, context model. Topic detection processor (170), call scoring processor (174) and call scoring database (176) may be used to facilitate the machine learning function. These processors and database, as described herein, may incorporate the real-time audio stream from the user device (136), in which the machine learning models are continuously being refined and stored in the models database (144).

The machine learning models stored in the models database (144) are used in the models. The real-time audio stream from user device (136) can be applied to the various machine learning models stored in this database (144) to provide real-time conversation guidance back to the user, also referred to as agent, herein. The behavior model processor (158) extracts the call audio data stored in the training data database (146), which contains raw training call audio data that is collected from users of the platform which may be collected from the user device streamer (138) and stored in the training data database (146) to be used to in the machine learning process.

The behavior model processor (158) is configured to perform acoustic signal processing on the extracted call audio data from the training data database (146). Acoustic signal processing is the electronic manipulation of acoustic signals. For example, various acoustic measurements are computed on moving windows/frames of the call audio, using both audio channels, such as the agent and the customer. Acoustic measurements include pitch, energy, voice activity detection, speaking rate, turn-taking characteristics, and time-frequency spectral coefficients (e.g., Mel-frequency Cepstral Coefficients). These acoustic measurements are used as inputs for the supervised machine learning process. The behavior model processor (158) extracts the data stored in the behavior training database (148), which contains labeled training data used by the behavior model processor (158), which uses acoustic signal processing to compute features used as inputs to various machine learning models. Such models are developed offline and once developed, can be used to make inferences in real-time. These computed features may be acoustic measurements, such as pitch, energy, voice activity detection, speaking rate, turn-taking characteristics, and time-frequency spectral coefficients, used as inputs during the machine learning process.

The labeled training data contained in the behavior training database (148) provides the targets for the machine learning process. The labeled training data contained in the behavior training database (148) is created through an annotation process, in which human annotators listen to various call audio data and classify intervals of the call audio data to be guidable intervals or not. This annotation process begins with defining what behavioral guidance is to be provided to a call agent, such as a reminder for agents if they are slow to respond to a customer request. Then-candidate behavioral intervals (CBIs) are defined for the human annotators, such as intervals greater than two seconds in duration where there is no audible speaking by either party on the call. Human annotators use these definitions to listen to the call audio data and label the data when these definitions are met.

There may be several iterations of refining the definitions to ensure that inter-rater reliability is sufficiently high or exceeds a desired predetermined threshold. A large volume of authentic call data, such as the call audio data stored in the training data database (146), is labeled for CBIs by human annotators. The next step in the annotation process is to identify the guidable behavioral intervals (GBIs), which are a subset of the CBIs classified as intervals being guidable or not. The GBIs are defined for the human annotators, and there may be several iterations of refining the definitions to ensure that inter-rater reliability is sufficiently high. Once the definitions have high inter-rater reliability, the human annotators classify all the CBIs as being guidable or not.

This CBI and GBI labeled training data is stored in the behavior training database (148), which may contain the audio interval or audio clip of the CBI, the acoustic measurements such as the pitch, energy, voice activity detection, speaking rate, turn-taking characteristics, time-frequency spectral coefficients, and the GBI such as if the CBI were classified as guidable or not. In some embodiments, the database (148) may contain each call audio data with the times that a CBI occurs and whether it is guidable or not or maybe structured in some other manner. The behavior model processor (158) then performs a supervised machine learning process using the data extracted from the training data database (146) and the behavior training database (148). For example, supervised machine learning may be the machine learning task of learning a function that maps an input to an output based on example input-output pairs. It infers a function from labeled training data consisting of a set of training examples. In supervised learning, each example is a pair consisting of an input object (typically a vector) and the desired output value (also called the supervisory signal).

A supervised learning algorithm analyzes the training data and produces an inferred function, which can be used for mapping new examples. An optimal scenario will allow for the algorithm to correctly determine the class labels for unseen instances. The learning algorithm can generalize from the training data to unseen situations in a "reasonable" way. For example, the dataset of calls containing features from the training data database (146), and targets, from the behavior training database (148) is split into training, validation, and test partitions. Supervised machine learning using neural networks is performed to optimize weights of a particular model architecture to map features to targets, with the minimum amount of error. A variety of model architectures are used, including stateful, for example, recurrent neural networks, or RNNs (152), and stateless, for example, convolutional neural networks, or CNNs (150); in some embodiments, a mix of the two may be used, depending on the nature of the particular behavioral guidance being targeted. The behavior model processor (158) determines the model with the highest accuracy. For example, this may be accomplished using standard binary classification metrics, including precision, recall, F1 score, and accuracy. For example, after experimenting with a large volume of model architectures and configurations, the best model is selected by evaluating accuracy metrics on the validation partition. The test partition is used simply for reporting final results to give an impression of how likely the model is to generalize well.

Then the behavior model, which is stored in models database (144) can represent the model with the highest determined accuracy. The context model processor (160) extracts the call audio data stored in the training data database (146), which contains raw training call audio data that is collected from users of the platform which may be collected from the user device streamer (138) and stored in the training data database (146) to be used to in the machine learning process. The context processor (160) then performs automatic speech recognition on the extracted call audio data from the training data database (146). For example, all call audio is processed using an automatic speech recognition (ASR) system, capable of both batch and real-time/streaming processing. Individual words or tokens are converted from strings to numerical vectors using a pre-trained word-embeddings model, which may either be developed or by using a publicly available one such as Word2Vec or GloVE. These word embeddings are the features or inputs to the machine learning process for modeling call phases. The context model processor (160) extracts the data stored in the context training database (162), which contains labeled training data that is used by the context model processor (160), which processes all the call audio data using an automatic speech recognition system and uses lexical-based features, which are the inputs to various machine learning models, which may be performed by batch processing offline or may be performed in real-time.

The labeled training data contained in the context training database (162) provides the targets for the machine learning process. The labeled training data in the context training database (162) is created through an annotation process. Human annotators listen to various call audio data and classify phases of the call audio data. This annotation process begins with defining the call phases, such as opening a call, information gathering, issue resolution, social, or closing. Human annotators can use these definitions to listen to the call audio data and label the data when these definitions are met. There may be several iterations of refining the definitions to ensure that inter-rater reliability is sufficiently high. Then a large volume of authentic call data is labeled for call phases by human annotators. The call phases labeled training data is stored in the context training database (162). The database (162) may contain the audio interval or audio clip of the call topic and the call topic label such as opening a call, information gathering, issue resolution, social, or closing.

The context model processor (160) then performs a supervised machine learning process using the data extracted from the training data database (146) and the context training database (162). For example, supervised machine learning may be the machine learning task of learning a function that maps an input to an output based on example input-output pairs. It infers a function from labeled training data consisting of a set of training examples. In supervised learning, each example is a pair consisting of an input object (typically a vector) and the desired output value (also called the supervisory signal). A supervised learning algorithm analyzes the training data and produces an inferred function, which can be used for mapping new examples. An optimal scenario will allow for the algorithm to correctly determine the class labels for unseen instances. This requires the learning algorithm to generalize from the training data to unseen situations in a "reasonable" way. For example, the labeled data stored in the context training database (162) from the annotation process provides the targets for the machine learning process, and the features from ASR data from the training data database (146) are used as the inputs. The dataset of calls containing features, from ASR data from the training data database (146), and targets, from the context training database (162), is split into training, validation, and test partitions.

Supervised machine learning using neural networks is performed to optimize weights of a particular model architecture to map features to targets, with the minimum amount of error. A variety of stateful model architectures involving some recurrent neural network layers are used. The context model processor (160) determines the model with the highest accuracy. For example, this may be accomplished using standard binary classification metrics, including precision, recall, F1 score, and accuracy. For example, after experimenting with a large volume of model architectures and configurations, the best model is selected by evaluating accuracy metrics on the validation partition. The test partition is used simply for reporting final results to give an impression of how likely the model is to generalize well. Then the context model processor (160) stores the model with the highest determined accuracy in the models database (144). The topic detection processor (170) extracts the call audio data stored in the training data database (146), which contains raw training call audio data that is collected from users of the platform which may be collected from the user device streamer (138) and stored in the training data database (146) to be used to in the machine learning process.

The topic detection processor (170) performs automatic speech recognition on the extracted call audio data from the training data database (146). For example, all call audio is processed using an automatic speech recognition (ASR) system, capable of both batch and real-time/streaming processing. Individual words or tokens are converted from strings to numerical vectors using a pre-trained word-embeddings model, which may either be developed or by using a publicly available one such as Word2Vec or GloVE. These word embeddings are the features or inputs to the machine learning process for modeling call topics. The topic detection processor (170) extracts the data stored in the topic training database (172), which contains labeled training data that is used by the topic detection processor (170), which processes all the call audio data using an automatic speech recognition system and uses lexical-based features that are the inputs to various machine learning models, which may be performed by batch processing offline or may be performed in real-time. The labeled training data contained in the topic training database (172) provides the targets for the machine learning process. The labeled training data in the topic training database (172) is created through an annotation process. Human annotators listen to various call audio data and classify topics of the call audio data.

This annotation process begins with defining the topics, such as customer requesting supervisor escalation or customer likely to churn. Human annotators use these definitions to listen to the call audio data and label the data when these definitions are met. There may be several iterations of refining the definitions to ensure that inter-rater reliability is sufficiently high. Then a large volume of authentic call data is labeled for call phases by human annotators. The call topics labeled training data is stored in the topic training database (172). The database may contain the audio interval or audio clip of the call topic and the call topic label, such as the customer requesting supervisor escalation or the customer's likelihood to churn. The topic detection processor (170) performs a supervised machine learning process using the data extracted from the training data database (146) and the topic training database (172). For example, supervised machine learning may be the machine learning task of learning a function that maps an input to an output based on example input-output pairs. It infers a function from labeled training data consisting of a set of training examples. In supervised learning, each example is a pair consisting of an input object (typically a vector) and the desired output value (also called the supervisory signal). A supervised learning algorithm analyzes the training data and produces an inferred function, which can be used for mapping new examples. An optimal scenario will allow for the algorithm to correctly determine the class labels for unseen instances. This permits the learning algorithm to generalize from the training data to unseen situations in a "reasonable" way. For example, the labeled data stored in the topic training database (172) from the annotation process provides the targets for the machine learning process, and the features from ASR data from the training data database (146) are used as the inputs.

The dataset of calls containing features, from ASR data from the training data database (146), and targets, from the topic training database (172), is split into training, validation, and test partitions. Supervised machine learning using neural networks is performed to optimize weights of a particular model architecture to map features to targets, with the minimum amount of error. A variety of stateful model architectures involving some recurrent neural network layers are used. The topic detection processor (170) determines the model with the highest accuracy. For example, this may be accomplished using standard binary classification metrics, including precision, recall, F1 score, and accuracy.

For example, after experimenting with a large volume of model architectures and configurations, the best model is selected by evaluating accuracy metrics on the validation partition. The test partition is used simply for reporting final results to give an impression of how likely the model is to generalize well. Then the topic detection processor (170) stores the model with the highest accuracy in the models database (144). The call scoring processor (174) extracts the call audio data stored in the training data database (146), which contains raw training call audio data that is collected from users of the platform which may be collected from the user device streamer (138) and stored in the training data database (146) to be used to in the machine learning process.

The call scoring processor (174) performs acoustic signal processing and automatic speech recognition on the extracted call audio data from the training data database (146). For example, all call audio is processed using an automatic speech recognition (ASR) system, capable of both batch and real-time/streaming processing. Individual words or tokens are converted from strings to numerical vectors using a pre-trained word-embeddings model, which may either be developed or by using a publicly available one such as Word2Vec or GloVE.

These word embeddings are the features or inputs to the machine learning process for modeling call scores. For example, Acoustic signal processing is the electronic manipulation of acoustic signals. For example, various acoustic measurements are computed on moving windows/frames of the call audio, using both audio channels, such as the agent and the customer. Acoustic measurements include pitch, energy, voice activity detection, speaking rate, turn-taking characteristics, and time-frequency spectral coefficients (e.g., Mel-frequency Cepstral Coefficients). The call scoring processor (174) extracts the data stored in the scoring training database (176), which contains labeled training data that is used by the call scoring processor (174), which processes all the call audio data using an automatic speech recognition system and uses lexical-based features that are the inputs to various machine learning models, which may be performed by batch processing offline or may be performed in real-time.

The labeled training data contained in the score training database (176) provides the targets for the machine learning process. The labeled training data in the scoring training database (176) is created through an annotation process. Human annotators listen to various call audio data and provide a call score for the call audio data. This annotation process begins with defining the call score construct, such as the perception of customer experience or customer satisfaction. Human annotators use these definitions to listen to the call audio data and label the data when these definitions are met. There may be several iterations of refining the definitions to ensure that inter-rater reliability is sufficiently high. Then a large volume of authentic call data is labeled for call phases by human annotators. The call score labeled training data is stored in the scoring training database (176).

The database (176) may contain the audio interval or audio clip of the call score and the call score label, such as customer experience perception or customer satisfaction. The call scoring processor (174) performs a supervised machine learning process using the data extracted from the training data database (146) and the scoring training database (176). For example, a preliminary, unsupervised machine learning process is carried out using an enormous volume of unlabeled call center audio data. In some embodiments, this unlabeled call center audio data may be audio data stored in the training data database (146). The machine learning training process involves grouping acoustic spectral measurements in the time interval of individual words, as detected by the ASR, and then mapping these spectral measurements, two-dimensional, to a one-dimensional vector representation maximizing the orthogonality of the output vector to the word-embeddings vector described above. This output may be referred to as "word-aligned, non-verbal embeddings."

The word embeddings are concatenated, with word-aligned, non-verbal embeddings to produce the features or inputs to the machine learning process for modeling call phases. The labeled data from the annotation process provides the targets for machine learning. The dataset of calls containing features and targets is split into training, validation, and test partitions. Supervised machine learning using neural networks is performed to optimize weights of a particular model architecture to map features to targets, with the minimum amount of error. A variety of stateful model architectures involving some recurrent neural network layers may be used. The call scoring processor (174) determines the model with the highest accuracy. For example, this may be accomplished using standard binary classification metrics, including precision, recall, F1 score, and accuracy.

For example, after experimenting with a large volume of model architectures and configurations, the best model is selected by evaluating accuracy metrics on the validation partition. The test partition is used simply for reporting final results to give an impression of how likely the model is to generalize well. Then the call scoring processor (174) stores the model with the highest accuracy in the models database (144).

Figure 15:
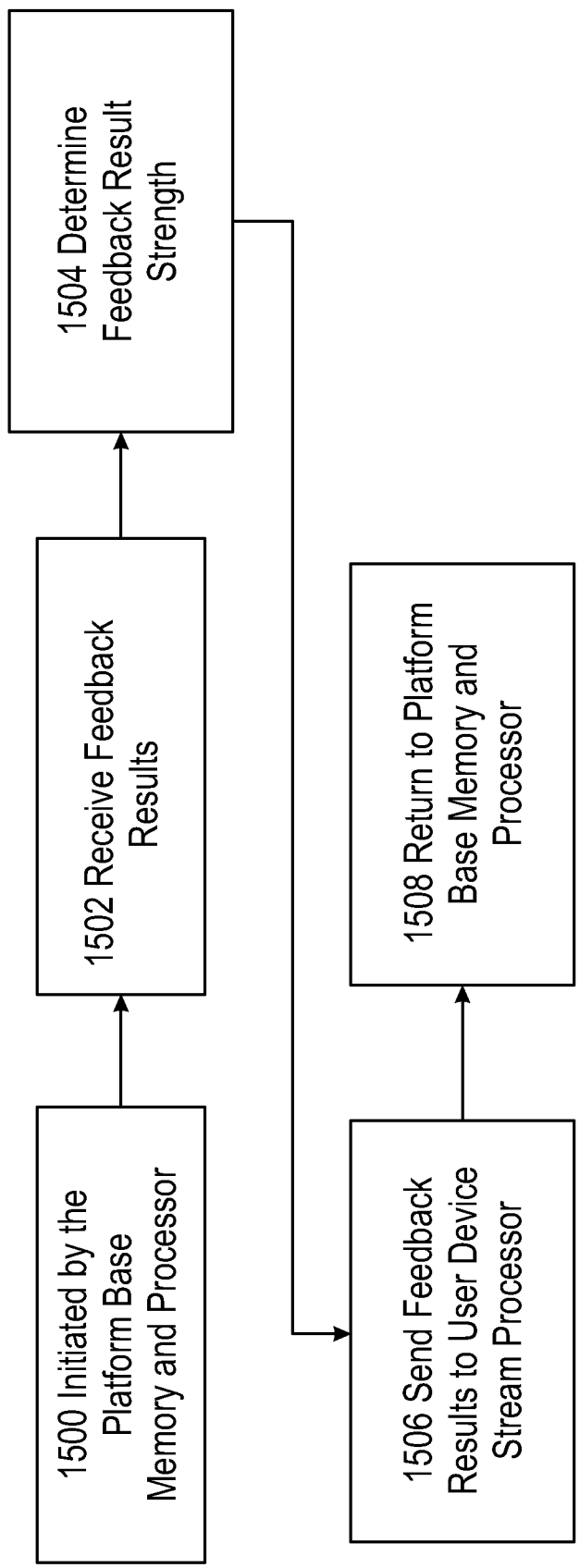
FIG. 15: illustrates an example of a process of a platform reporting processor.

FIG. 15 shows an example of the functioning of the platform reporting processor (130). As shown by 1500, the platform base, with associated memory and processor, (108) initiates the platform reporting processor (130).

As shown by 1502, the platform reporting processor (130) receives the feedback results from the platform rules processor (118) and the platform NLP processor (122).

Then, as shown by 1504, the platform reporting processor (130) then determines the strength of the feedback results. For example, the power of the feedback may be determined by the feedback results from the platform rules processor (118) and the platform NLP processor (122), such as the platform rules processor (118) and the platform NLP processor (122) both send feedback that is "Customer is Angry" then that would prompt more substantial feedback to the call agent. However, if the platform rules processor (118) sends the feedback the "Customer is Angry," and the platform NLP processor sends the feedback "Speak Slower," then the call agents would not be strong as if they both had the same feedback. This strength of feedback may be represented by a percentage, color representation, rating number such as 1-5 to visually show the call agent the strength of the feedback they are receiving.

Then as shown by 1506, the platform reporting processor (130) sends the feedback results to the user device streamer (138); for example, the platform reporting processor (130) sends the feedback that the customer is angry, the customer is satisfied, the customer is confused, etc. Platform reporting processor (130) may perform the operation described in step 1816 in FIG. 18.

As shown by 1508, the platform reporting processor (130) then returns to the platform base (108).

Figure 16:
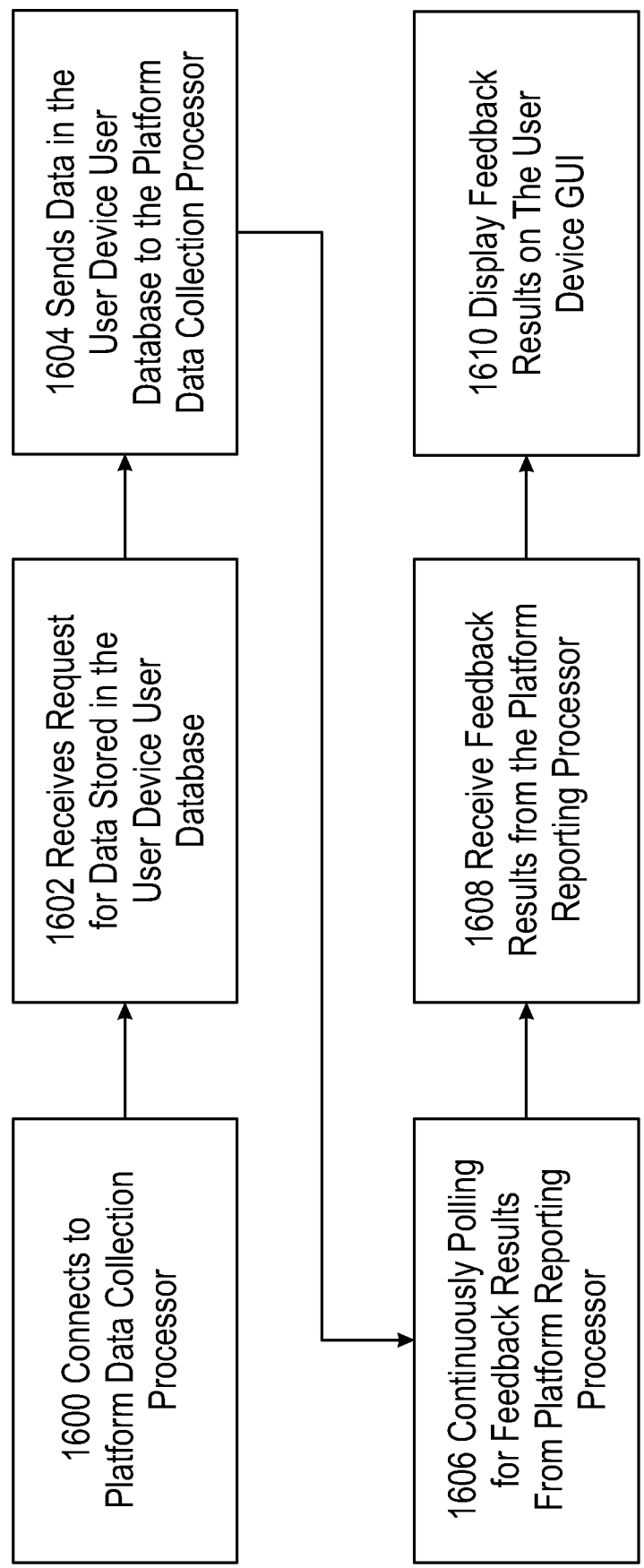
FIG. 16: illustrates an example of a user device streamer.

FIG. 16 shows an example of the functioning of the user device streamer (138). As shown by 1600, the process begins with the user device streamer (138) connecting to the platform data collection processor (104).

As shown by 1602, the user device streamer (138) receives an output from platform data collection processor (104) related to the data stored in the user database (140). For example, the data may be the raw audio data from the call agent's interaction with a client. The user database (140) can contain the user ID, for example, TS 789654, the company, for example, Comcast, and the audio file, which may be stored as a separate audio file for each call the user completes.

As shown by 1604, the user device streamer (138) sends the data stored in the user database (140) to the platform data collection processor (104).

As shown by 1606, the user device streamer (138) continuously polls for the feedback results from the platform reporting processor (130).

As shown by 1608, user device streamer (138) receives the feedback results from the platform reporting processor (130). For example, the feedback received from the platform reporting processor (130) may be angry; the customer is confused; the customer is satisfied, speak faster, louder, slower, etc. In some embodiments, the strength of the feedback may be represented by a percentage, color code, rating, etc., to allow the call agent to visually understand the strength of the feedback they are receiving.

As shown by 1610, the user device streamer (138) uses the GUI (142) to display feedback results.

Figure 17:
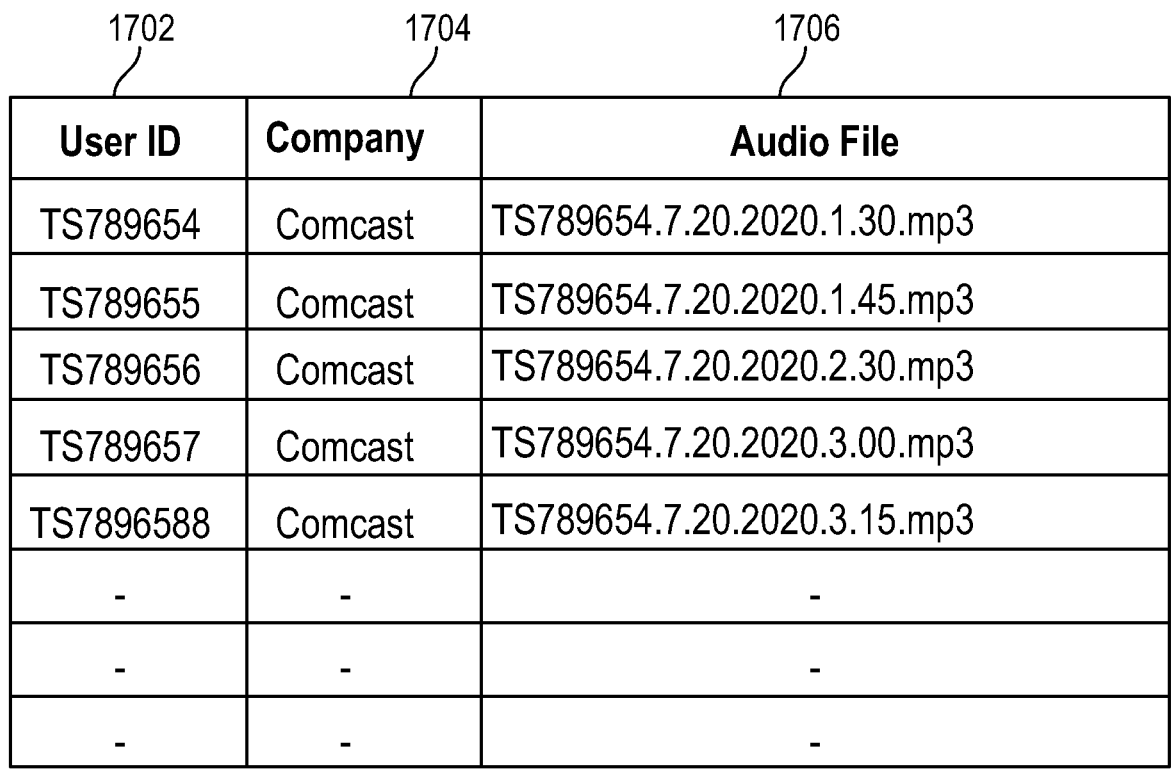
FIG. 17: illustrates an example of a user database.

FIG. 17 shows an example of the functioning of the user database (140). User database (140) contains the raw audio data from the call agent's interaction with a client. For example, the user database (140) contains the user ID 1702, for example, TS 789654, the company 1704, for example, Comcast, and the audio file 1706, which may be stored as a separate audio file for each call the user completes. In some embodiments, the audio file 1706 may be one large file that contains the audio from the agent's entire workday. The audio data stored in audio file 1706, may also be streamed to platform (102) or server in real-time for real-time analysis performed on the audio data to provide the call agents with notifications or suggestions during a call.

FIG. 18 shows an example of the functioning of the models processor (145). The process begins with the models processor (145) connecting to the user device streamer (138) to receive the audio stream 1800 from the user device (136), which may be a real-time audio stream of a call such as a current interaction with a user of the platform and a client such as an audio call. The audio stream 1800 may be applied to a directed acyclic graph in which is applied in real-time. A directed acyclic graph may be a directed graph with no directed cycles. It consists of vertices and edges (also called arcs), with each edge directed from one vertex to another, such that there is no way to start at any vertex v and follow a consistently-directed sequence of edges that eventually loops back to v again. Equivalently, a DAG is a directed graph with a topological ordering, a sequence of the vertices such that every edge is directed from earlier to later in the sequence. A directed acyclic graph may represent a network of processing elements in which data enters a processing element through its incoming edges and leaves the element through its outgoing edges. For example, the connections between the elements may be that some operations' output is the inputs of other operations. They can be executed as a parallel algorithm in which each operation is performed by a parallel process as soon as another set of inputs becomes available to it.

The audio stream 1800 may be the inputs for the ASP 1802, ASR 1804, and the call type model 1810. Then the models processor (145) initiates the ASP 1802 or acoustic signal processing. The ASP 1802 operation input is the audio stream 1800 received from the user device (136); the ASP 1802 may be initiated as soon as the audio stream 1800 is received as the input. Acoustic signal processing 1802 is used to compute features that are used as input to machine learning models (128, 150, 152). A variety of acoustic measurements are computed on moving windows/frames of the audio, using both audio channels. Acoustic measurements include pitch, energy, voice activity detection, speaking rate, turn-taking characteristics, and time-frequency spectral coefficients (e.g., Mel-frequency Cepstral Coefficients). These acoustic measurements are the features or inputs to the machine learning process. In some embodiments, this may be done through accomplished in real-time or through batch processing offline. The output of the features is then sent to the behavioral processor (158) 1806 and the call score processor (174) and call scoring database (176) 1814. Then the models processor (145) initiates the ASR 1804 or automatic speech recognition. The audio stream 1800 is the input, and the ASR 1804 may be initiated as soon as the audio stream 1800 is received as the input. All the received audio stream 1800 data, or call audio, is processed using an automatic speech recognition (ASR) system, capable of both batch and real-time/streaming processing. Individual words or tokens are converted from strings to numerical vectors using a pre-trained word-embeddings model that may either be developed or be publicly available, such as Word2Vec or GloVE.

These word embeddings are the features or inputs to the machine learning process for modeling call phases, such as the context model 1808. These outputted features may be sent to the context model 1808, topic detection model 1812, and the call score model as the inputs to those operations at step 1804. The models processor (145) initiates the behavioral model 1806, or the behavioral model 1806 is initiated as soon as the data is received from the ASP 1802 operation. The behavioral model 1806 may apply a machine-learning algorithm to the received features from the ASP 1802, such as the machine learning model created and stored in the process described in the behavior model processor (158). The features from the ASP 1802, such as the acoustic measurements, for example, the pitch, energy, voice activity detection, speaking rate, turn-taking characteristics, and time-frequency spectral coefficients (e.g., Mel-frequency Cepstral Coefficients). The applied machine learning model outputs a probability of a GBI, or guidable behavioral intervals such as an agent is slow to respond to a customer request, which is binarized by applying a threshold to the outputted probability.

Indeed, additional post-processing can be applied to determine a certain duration of activity before the notification is triggered or to specify a minimum or maximum duration of the notification activity. The notification output of the behavioral model 1806 is sent to be inputted into notification 1816. In some embodiments, the models processor (145) may extract the behavioral model 1806 machine learning model that is stored in the models database (144) and apply the extracted machine learning model to the received features from the ASP 1802, which outputs a probability of a GBI, or guidable behavioral intervals such as an agent is slow to respond to a customer request, so this binarized by applying a threshold to the outputted probability. In some embodiments, additional post-processing can be applied to determine a certain duration of activity before the notification is triggered or to specify a minimum or maximum duration of the notification activity.

This outputted notification is used as the input for the notification 1816, at 1806. The models processor (145) initiates the context model 1808, or the context model 1808 is initiated as soon as the data is received from the ASR 1804 operation. The context model 1808 may apply a machine-learning algorithm to the received features from the ASR 1804, such as the machine learning model created and stored in the process described in the context model processor (160). The ASR 1804, such as the individual words or tokens converted from strings to numerical vectors using a pre-trained word-embeddings model. The model's output is the call phase of the audio stream 1800, such as the opening, information gathering, issue resolution, social, or closing. It is sent as input to notification 1816. In some embodiments, the models processor (145) may extract the context model 1808 machine learning model that is stored in the models database (144) and apply the extracted machine learning model to the received features from the ASR 1804, which outputs the call phase such as the opening, information gathering, issue resolution, social, or closing. In some embodiments, the model may output a probability of the call phase, which may be binarized by applying a threshold to the outputted probability. In some embodiments, additional post-processing can be applied to determine a certain duration of activity before the notification is triggered or to specify a minimum or maximum duration of the notification activity.

This outputted notification is used as the input for the notification 1816, at step 1808. The models processor (145) initiates the call type model 1810, or the call type model is initiated as soon as the data is received from the audio stream 1800. The call type model 1810 determines the detection of call or conversation type such as a sales call, member services, IT support, etc. This is completed using meta-data in the platform and subsequent application of a manually configurable decision tree. For example, the audio data available from the audio stream may be a member of the platform or call the agent on a certain team, such as sales, IT support, etc., and the call is either outbound or inbound. Rules may be applied to this type of metadata to determine call type. The call type output is then sent to notification 1816, which is used as the input, at step 1810. The models processor (145) initiates the topic detection model 1812, or the topic detection model 1812 is initiated as soon as the data is received from the ASR 1804 operation. The topic detection model 1812 may apply a machine-learning algorithm to the received features from the ASR 1804, such as the machine learning model created and stored in the process described in the topic detection processor (170). The ASR 1804, such as the individual words or tokens converted from strings to numerical vectors using a pre-trained word-embeddings model.

The model's output is the call topic of the audio stream 1800, such as the customer requesting supervisor escalation, the customer is likely to churn, etc., and is sent as the input to notification 1816. In some embodiments, the models processor (145) may extract the topic detection model 1812 machine learning model that is stored in the models database (144) and apply the extracted machine learning model to the received features from the ASR 1804, which outputs the call topic such as the customer requesting supervisor escalation, the customer is likely to churn, etc. In some embodiments, the model may output a probability of the call topic which may be binarized by applying a threshold to the outputted probability. In some embodiments, additional post-processing can be applied to determine a certain duration of activity before the notification is triggered or to specify a minimum or maximum duration of the notification activity. This outputted notification is used as the input for the notification 1816, at step 1812. The models processor (145) initiates the call score model 1814, or the call score model 1814 is initiated as soon as the data is received from the ASP 1802 operation and ASR 1804 operation.

The call score model 1814 may apply a machine-learning algorithm to the received features from the ASP 1802 and the ASR 1804, such as the machine learning model created and stored in the process described in the call scoring processor (174). The features from the ASP 1802, such as involve the computation of time-frequency spectral measurements, i.e., Mel-spectral coefficients or Mel-frequency cepstral coefficients, and the data from the ASR 1804, such as the individual words or tokens that are converted from strings to numerical vectors using a pre-trained word-embeddings model. This process of acoustic signal processing, ASR processing, and transformation to feature vector involving concatenation of word-embeddings and word-aligned non-verbal embeddings is performed incrementally, in real-time. These measurements are used as input to the trained models that produce outputs of a call score sent as an input to the notification 1816. In some embodiments, the models processor (145) may extract the call scoring model 1814 machine learning model that is stored in the models database (144) and apply the extracted machine learning model to the received features from the ASP 1802 and the ASR 1804, which outputs the call score such as the customer experience rating or customer satisfaction rating, etc. In some embodiments, the model may output a probability of the call topic, which may be binarized by applying a threshold to the outputted probability. In some embodiments, additional post-processing can be applied to determine a certain duration of activity before the notification is triggered or to specify a minimum or maximum duration of activity of the notification. This outputted notification is used as the input for the notification 1816, at step 1814.

Then the models processor (145) initiates the notification 1816. The notification 1816 is initiated as soon as the data is received from the behavioral model 1806, context model 1808, call type model 1810, topic detection model 1812, or the call score model 1814. Given the ability to detect behavioral guidance and the two dimensions of context such as call/conversation phases and types, an algorithm is configured such that specific types of behavioral guidance are only emitted, sent, and displayed to the user if the phase-type pair is switched to "on." This phase-type grid configuration can be done manually by hand or can be done via automated analysis given information on top and bottom performing call center agents. The acoustic signal processing and machine learning algorithms applied for behavioral guidance involve considerably less latency than the context model 1808 or call phase detection, which depends on automatic speech recognition.

The present systems and methods handle this by operating on "partial" information regarding call phases when deciding whether to allow behavioral guidance or not for real-time processing. This enables the presentation of behavioral guidance as soon as it is detected—which is useful for the targeted user experience. Post-call user experiences can show complete information based on what the analysis would have shown if latency was not a concern. For example, the speech recognizer is producing real-time word outputs. It has a delay of between 0.5 seconds and six seconds after the word is spoken. These words are used as input to a call phase classifier, which has approximately the same latency. Detection of behaviors, such as slow to respond, has much less latency. When a slow response is produced and detected, the latest call scene or phase classification is checked to determine whether or not to show the slow response. This is partial information because it is unknown what the call scene or phase classifier is for the current time point. After the call is finished, all the information is available so there can be complete measurements. Still, in real-time, decisions are based on whatever call scene data is available to that point to provide low latency guidance. In instances when it is appropriate to send notifications to the user, notification 1816 receives the outputs of the behavioral model 1806, context model 1808, call type model 1810, topic detection model 1812, and the call score model 1814 as inputs, and the output notification is sent to the user device streamer (138), where it is displayed on the GUI (142).

For example, the context-aware behavioral guidance and detected topics can be displayed in real-time to call center agents via a dialog mini-window, which may be displayed on GUI (142). Events are emitted from the real-time computer system to a message queue, which the front-end application is listening on. The presence of new behavioral guidance events results in notifications appearing in the user interface. This data is also available for consumption by agents and their supervisors in the user experience for post-call purposes. Both call phases and behavioral guidance are presented alongside the call illustration in the user interface, such as in a PlayCallView. The data provided in the notification can be an actionable suggestion or recommendation, such as a tip or nudge on how to behave, or it could be a hyper-link to some internal or external knowledge source at step 1816.

Figure 19:
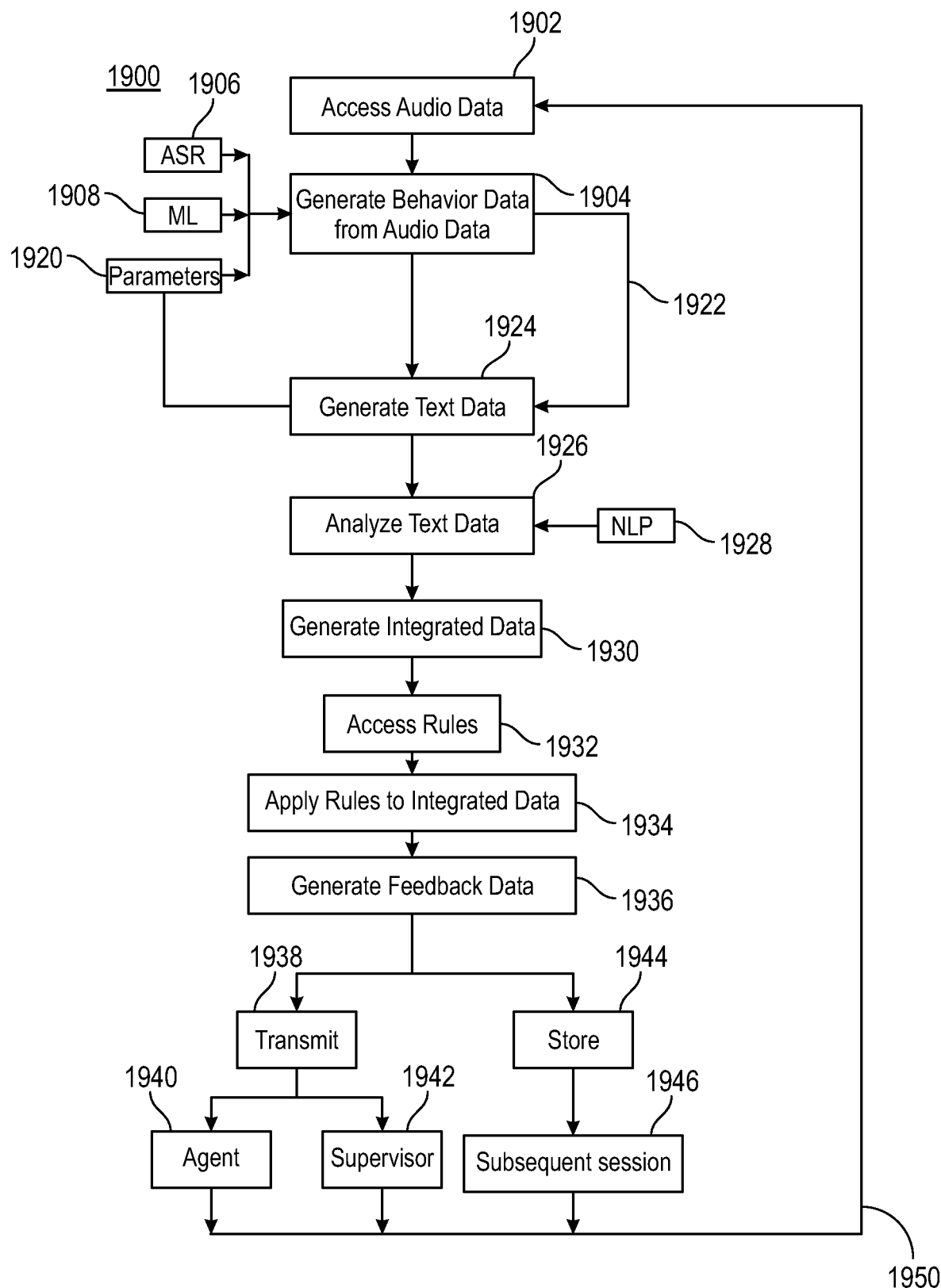
FIG. 19: illustrates an example process of generating feedback data according to an embodiment of the disclosure.

FIG. 19 illustrates an example process 1900 of generating feedback data according to an embodiment of the disclosure. Audio data is accessed, 1902. This audio data may be obtained in real-time or be accessed from a storage location that stores the audio data from a prior communication session between a caller and an agent. Behavioral data is generated from the audio data, 1904. The behavioral data can be generated based, at least in part, on ASR, 1906, machine learning 1908 and parameters 1920. Text data is generated from the audio data, 1924. The text data may be based on the same audio data accessed in 1902, as shown by 1922. Alternatively, the text data could be based on other audio data. The text data is analyzed, 1926 based at least in part on NLP processing, 1928.

Integrated data is generated 1930. The integrated data is generated by combining the behavioral data and the analyzed text data.

A set of one or more rules are accessed, 1932. These rules may be stored in a database, as described herein. The rules are applied to the integrated data, which represents a combination of behavioral data and analyzed text data 1934.

Feedback data is generated 1936. This feedback data represents the integrated data that has been filtered through a rules engine.

The feedback data can be transmitted, 1938 to an agent's workstation, 1940 and/or a supervisors workstation 1942. The feedback data may also be stored 1944 for a subsequent session 1946. The transmitted and/or stored data may be provided as audio data, as shown by 1950.

Figure 20:
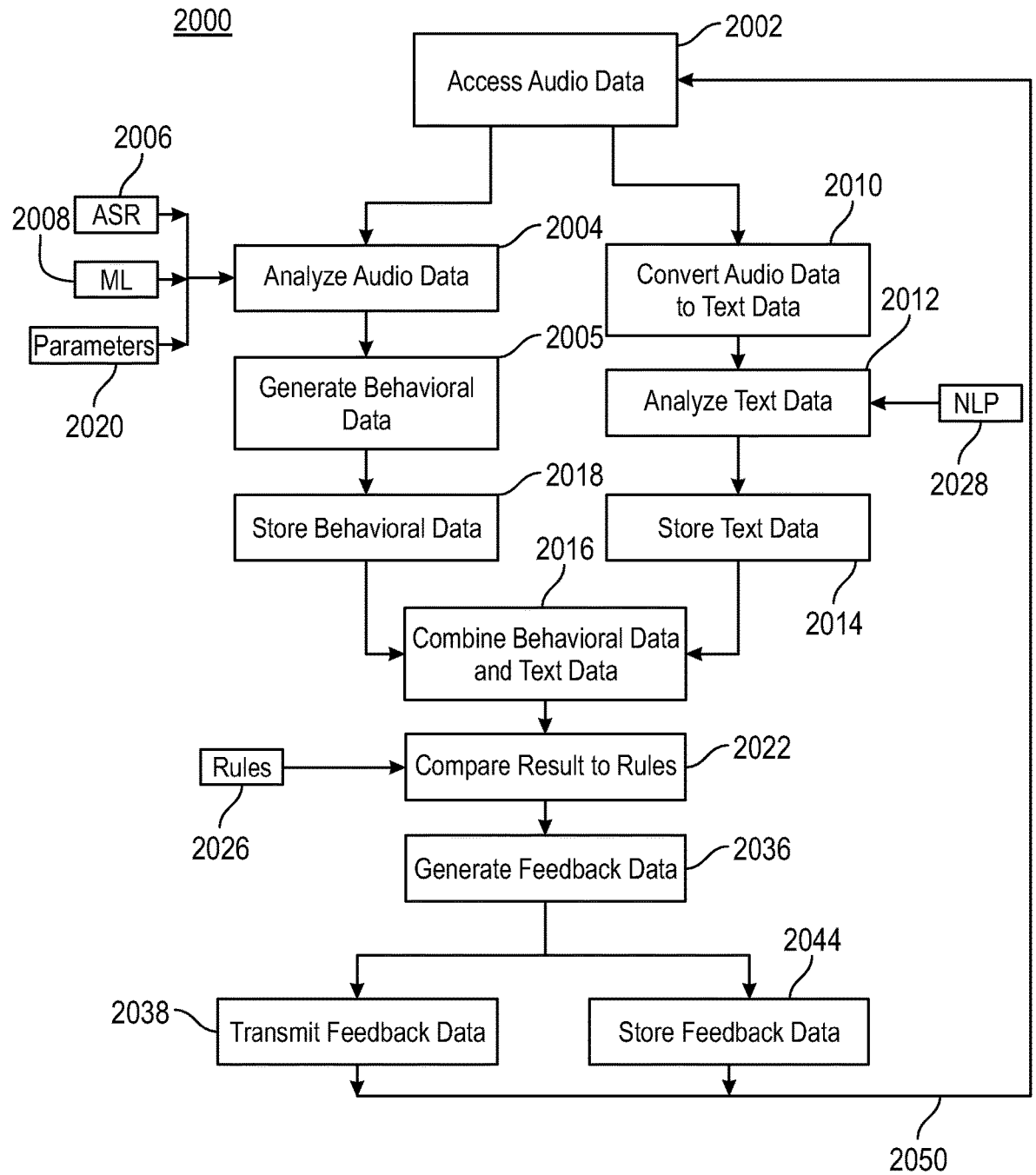
FIG. 20: illustrates an example process of generating feedback data according to an embodiment of the disclosure.

FIG. 20 illustrates an example process 2000 of generating feedback data according to an embodiment of the disclosure.

Audio data is accessed, 2002. This audio data may be obtained in real-time or be accessed from a storage location that stores the audio data from a prior communication session between a caller and an agent. The audio data is analyzed, 2004, to generate behavioral data, 2005. The behavioral data can be generated based, at least in part, on ASR, 2006, machine learning 2008 and parameters 2020. The behavioral data is stored, 2018, for example in an electronic memory.

At least a portion of the audio data, from 2002, is converted to text data 2010. The text data is analyzed, 2012, using for example, NLP, 2028.

The text data is stored, 2014, for example, in an electronic memory. The behavioral data and text data are combined, or integrated, 2016. This combined data, or integrated data, is compared, 2022, to rules, 2026. These rules may be stored in a database, as described herein. The rules are applied to the combined data, which represents a combination of behavioral data and analyzed text data. The application of the rules includes comparing the integrated data to the rules. This may also include filtering the integrated data using rules.

Feedback data is generated 2036. This feedback data represents the compared data that has been adjusted, such as by application of rules, comparing the data to the rules and/or filtering the data by a rules engine.

The feedback data can be transmitted, 2038 to a selected device and/or stored at a selected device and/or memory 2044 for a subsequent session. The transmitted and/or stored data may be provided as audio data, as shown by 2050.

The embodiment shown in FIG. 20 may be referred to as late fusion. As described above, late fusion utilizes combining acoustic and text input data at a late stage.

Figure 21:
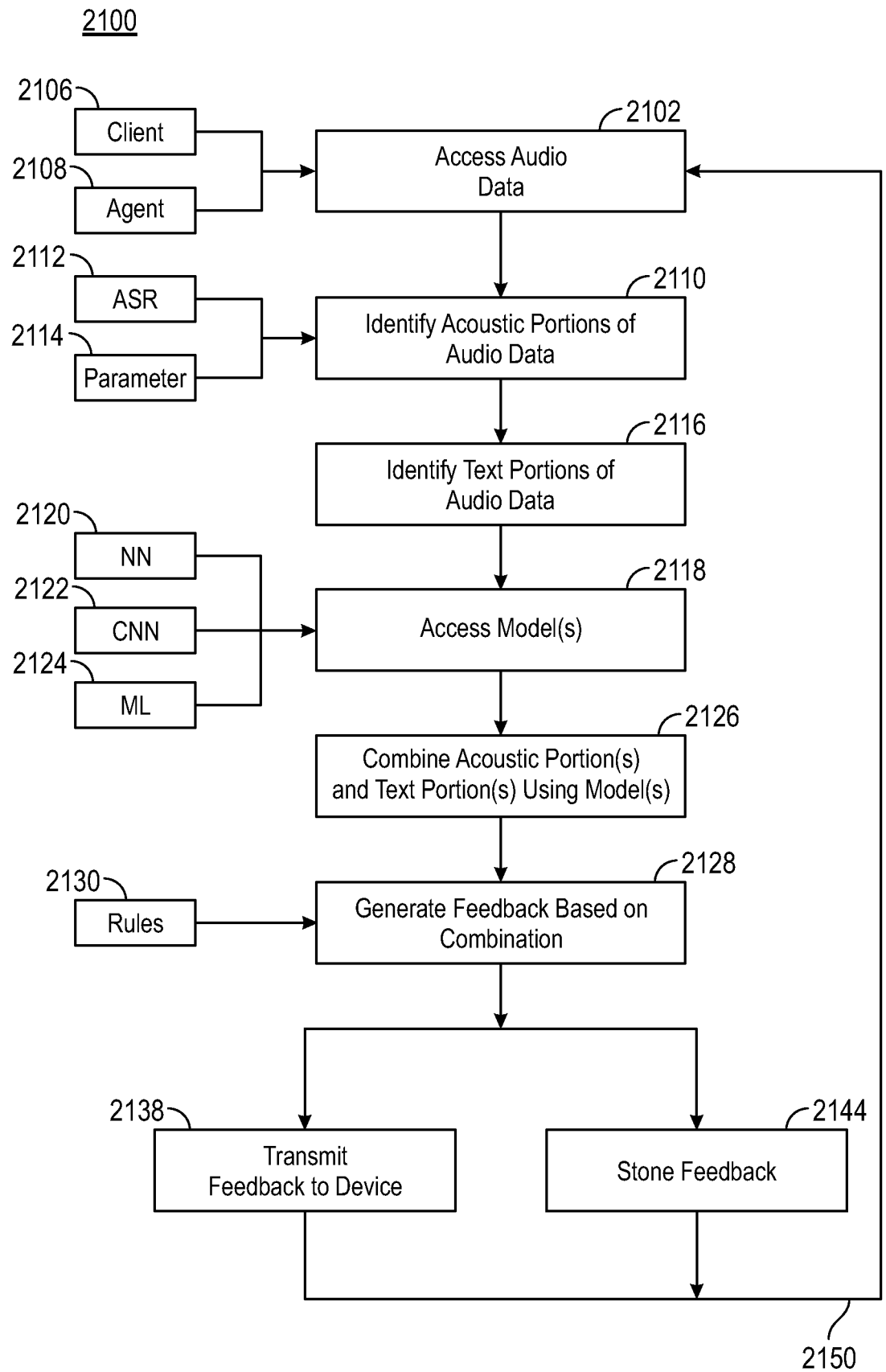
FIG. 21: illustrates an example of early fusion according to an embodiment of the disclosure.

FIG. 21 shows an embodiment of early fusion. This embodiment is directed to combining acoustic and text input data at an early stage using multi-modal neural network model architectures.

As shown in FIG. 21, early fusion is implemented by accessing audio data, 2102. This audio data may be obtained during a client agent communication session. The audio data may include portions of the client speaking, 2106 and/or portions of the agent speaking, 2108.

Acoustic portions of the audio data are identified, 2110. This identification may include ASR, 2112 and/or other parameters, 2114, which may include the length of the event, a number, or quantity of speakers on the audio file, how many words per minute was the agent saying, how many words per minute was the client saying, what was the tone, pitch, or fundamental frequency or waveform frequency of the agent, what was the tone, pitch, or fundamental frequency or waveform frequency of the client, etc.

Models, such as multi-modal neural network model architectures, recurrent neural network models, 2020, convolutional neural network models, 2122 and/or machine learning models, 2124 are accessed, 2118. Typically, the models that are accessed are accessed from a database since the models are typically created prior to application. The learning process of the models can happen off line and the processing results are then stored for subsequent application to the acoustic and text portions.

The acoustic portions and the text portions are combined, 2126, using one or more of the models, which are typically retrieved from a storage location and applied to the acoustic portions and text portions. This is an early fusion embodiment since the combination of text portions and acoustic portions occurs prior to application of rules. Following the combination, feedback data is generated, 2128. This feedback data may be the result of application of rules being applied to the combination, 2130.

The feedback data may then be transmitted to a selected device, 2138 and/or stored in an electronic memory, 2144. The feedback data can be used as a portion of audio data, 2150 for subsequent communication sessions between an agent and a client.

Another embodiment is directed to a computer-implemented method for outputting feedback to a selected device, the method comprising: using at least one hardware processor for extracting code for: accessing audio data; identifying one or more acoustic portions of the audio data; identifying one or more text portions of the acoustic data; accessing one or more models; combining the one or more acoustic portion of the audio data and the one or more text portions of the audio data using the one or mode models; generating feedback data based on the combining; and outputting the feedback to a selected device.

For example, a method is disclosed of integrating the analysis of a real-time word with a behavioral analysis from the application of acoustic signal processing and machine learning algorithms analyzed audio data comprising: analyzing audio data using an application of acoustic signal processing and machine learning algorithms, converting audio data to text data, analyzing the text data using an NLP, storing the results of each analysis in a historical database, comparing the results of each analysis to a rules database, extracting a feedback result from the rules database, and sending the feedback result to a user.

The functions performed in the above-described processes and methods may be implemented in differing order. Furthermore, the outlined steps and operations are only provided as examples. Some of the steps and operations may be optional, combined into fewer steps and procedures, or expanded into additional steps and procedures without detracting from the disclosed embodiments' essence.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject disclosure as defined by the appended claims.

I claim:

1. A computer-implemented method for outputting feedback data to a selected device, the method comprising:
   using at least one hardware processor for extracting code for:
   accessing audio data from a communication session between a caller and an agent;
   generating behavioral data by performing behavioral analysis of at least a portion of the audio data, the behavioral analysis including acoustic signal processing of the portion of audio data and applying one or more machine learning algorithms to the portion of the audio data;
   generating text data by converting at least a portion of the audio data to text data;
   analyzing the text data using natural language processing;
   generating integrated data by combining the behavioral data with the analyzed text data;
   accessing rules of a set of rules;
   comparing the integrated data to the rules;
   generating feedback data based on the comparison; and
   outputting the feedback data to the selected device during the communication session between the caller and the agent.

2. The computer-implemented method of claim 1, further comprising:
   identifying one or more parameters of the audio data; and
   utilizing one or more of the parameters during the generation of the behavioral data and the generation of the text data.

3. The computer-implemented method of claim 2, wherein the parameters include indicators of an emotional state of a caller.

4. The computer-implemented method of claim 1, wherein the selected device is a supervisory device.

5. The computer-implemented method of claim 1, wherein the selected device is an agent device.

6. The computer-implemented method of claim 1, wherein the selected device is located at a remote location.

7. The computer-implemented method of claim 1, further comprising:
   utilizing the feedback data to affect a subsequent communication session.

8. A system for outputting feedback data to a selected device, comprising:
   one or more memories configured to store representations of data in an electronic form; and one or more processors, operatively coupled to one or more of the memories, the processors configured to access the data and process the data to:
- access audio data from a communication session between a caller and an agent;
- generate behavioral data by performing behavioral analysis of at least a portion of the audio data, the behavioral analysis including acoustic signal processing of the portion of audio data and applying one or more machine learning algorithms to the portion of the audio data;
- store the behavioral data;
- generate text data by converting at least a portion of the audio data to text data;
- analyze the text data by applying natural language processing to the text data;
- store the text data;
- combine the stored behavioral data with the stored text data;
- compare the combined behavioral data and the text data to one or more rules;
- generate feedback data based on the comparison; and
- output the feedback data to the selected device during the communication session between the caller and the agent.

9. The system of claim 8, further comprising:
identifying one or more parameters of the audio data; and
utilizing one or more of the parameters during the generation of the behavioral data and the generation of the text data.

10. The system of claim 9, wherein the parameters include indicators of an emotional state of a caller.

11. The system of claim 8, wherein the selected device is a supervisory device.

12. The system of claim 8, wherein the selected device is an agent device.

13. The system of claim 8, wherein the selected device is located at a remote location.

14. The system of claim 8, further comprising:
utilizing the feedback data to affect a subsequent communication session.

15. The system of claim 8, further comprising: storing the feedback data in a database.

16. A computer-implemented method for outputting feedback data to a selected device, the method comprising:
using at least one hardware processor for extracting code for:
- accessing audio data from a communication session between a caller and an agent;
- identifying one or more acoustic portions of the audio data;
- identifying one or more text portions of the acoustic data;
- accessing one or more models;
- combining the one or more acoustic portion of the audio data and the one or more text portions of the audio data using the one or mode models;
- generating feedback data based on the combining; and
- outputting the feedback data to the selected device during the communication session between the caller and the agent.

17. The computer-implemented method of claim 1, wherein the feedback data includes an action for the agent to take during the communication session based in part on the generated integrated data.

18. The computer-implemented method of claim 17, wherein the action for the agent to take includes speaking louder or faster during the communication session.

19. The system of claim 8, wherein the feedback data includes an action for the agent to take during the communication session based in part on the generated integrated data.

20. The system of claim 19, wherein the action for the agent to take includes speaking louder or faster during the communication session.

\* \* \* \* \*